(12) United States Patent
Simmons et al.

(10) Patent No.: US 7,591,485 B2
(45) Date of Patent: Sep. 22, 2009

(54) CONNECTIONS FOR TUBING AND METHOD OF CONNECTING TUBING SEGMENTS

(76) Inventors: Tom M. Simmons, 3670 Raucholz Rd., Hemlock, MI (US) 48626; John M. Simmons, 5650 N. Smith Rd., Henderson, MI (US) 48841; David M. Simmons, 8873 N. Brookshire Dr., Saginaw, MI (US) 48609

( * ) Notice: Subject to any disclaimer, the term of this patent is extended or adjusted under 35 U.S.C. 154(b) by 363 days.

(21) Appl. No.: 11/179,724

(22) Filed: Jul. 11, 2005

(65) Prior Publication Data
US 2007/0007764 A1 Jan. 11, 2007

(51) Int. Cl.
*F16L 39/00* (2006.01)

(52) U.S. Cl. .................. 285/125.1; 285/129.1; 285/208; 285/206

(58) Field of Classification Search ............. 285/124.4, 285/124.3, 124.2, 245, 124.5, 332.1, 334.5, 285/332, 206, 207, 208, 122.1, 129.1, 125.1
See application file for complete search history.

(56) References Cited

U.S. PATENT DOCUMENTS

| | | | | |
|---|---|---|---|---|
| 974,975 | A | * | 11/1910 | Kelly ....................... 285/332.1 |
| 1,363,713 | A | * | 12/1920 | Broido ..................... 285/125.1 |
| 1,368,783 | A | * | 2/1921 | Broido ..................... 285/332.1 |
| 1,379,811 | A | * | 5/1921 | Fyffe ....................... 285/332.1 |
| 1,384,989 | A | * | 7/1921 | Bray ........................ 285/332.1 |
| 1,497,497 | A | * | 6/1924 | Gapp ....................... 285/332.1 |
| 1,692,154 | A | * | 11/1928 | Broido et al. ............... 285/332 |
| 1,856,072 | A | * | 5/1932 | Gordon ..................... 285/332 |
| 1,975,494 | A | * | 10/1934 | Armacost ................ 285/125.1 |
| RE23,137 | E | * | 7/1949 | Hobbs .................... 285/334.5 |
| 2,694,583 | A | * | 11/1954 | Kintz et al. .............. 285/125.1 |
| 2,877,028 | A | * | 3/1959 | Knight .................... 285/124.4 |
| 3,233,921 | A | * | 2/1966 | Holmgren et al. ........ 285/332.1 |
| 3,506,029 | A | * | 4/1970 | Demler Sr. et al. .......... 285/332 |
| 3,830,532 | A | | 8/1974 | Roberts |
| 3,977,708 | A | | 8/1976 | Jopp |
| 3,989,283 | A | | 11/1976 | Pepper |

(Continued)

FOREIGN PATENT DOCUMENTS

DE 19743185 A1 4/1999

(Continued)

OTHER PUBLICATIONS

International Search Report, dated Nov. 7, 2006 (5 pages).

*Primary Examiner*—David E Bochna
(74) *Attorney, Agent, or Firm*—TraskBritt

(57) ABSTRACT

Coupling structures for tubing are disclosed. Particularly, caps configured for receiving one or more tube segments therein, and securing the tube segments to a component having protrusions thereon including bores therethrough in a fluid-tight manner are disclosed. The caps may have bores longitudinally therethrough for receiving the tube segments, the bore walls being free from projections to fit tightly against the tube segments. A longitudinally distal annular recess of the cap may be threaded to be secured to a component. In another alternative, caps having separate apertures for receiving attachment elements to secure the cap and the component are disclosed. Caps configured with a bore for receiving a tube segment, and separate apertures for receiving attachment pins are additionally disclosed.

57 Claims, 14 Drawing Sheets

U.S. PATENT DOCUMENTS

| | | | |
|---|---|---|---|
| 4,046,479 A * | 9/1977 | Paley | 285/332 |
| 4,321,911 A * | 3/1982 | Offutt | 285/124.1 |
| 4,468,054 A * | 8/1984 | Orth | 285/124.3 |
| 4,647,084 A * | 3/1987 | Hagin et al. | 285/332.1 |
| 4,762,116 A * | 8/1988 | Vincent | 126/563 |
| 4,848,802 A | 7/1989 | Wolf et al. | |
| 4,953,580 A * | 9/1990 | Schabert et al. | 285/23 |
| 5,024,468 A | 6/1991 | Burge | |
| 5,261,705 A * | 11/1993 | Takahashi et al. | 285/332 |
| 5,294,156 A * | 3/1994 | Kumazaki et al. | 285/124.2 |
| 5,297,523 A * | 3/1994 | Hafner et al. | 123/456 |
| 5,472,244 A | 12/1995 | Nishikata et al. | |
| 5,499,612 A * | 3/1996 | Haughney et al. | 123/470 |
| 5,556,138 A * | 9/1996 | Nakajima et al. | 285/124.4 |
| 5,584,513 A | 12/1996 | Sweeny et al. | |
| 5,645,301 A | 7/1997 | Kingsford et al. | |
| 5,676,406 A | 10/1997 | Simmons et al. | |
| 5,765,534 A * | 6/1998 | Brown et al. | 285/334.1 |
| 5,820,167 A * | 10/1998 | Linkner, Jr. | 285/124.1 |
| 5,865,474 A * | 2/1999 | Takahashi | 285/124.1 |
| 5,890,746 A | 4/1999 | Mueller | |
| 6,045,164 A | 4/2000 | Nishio | |
| 6,386,593 B1 * | 5/2002 | Slais et al. | 285/205 |
| 6,402,206 B1 | 6/2002 | Simmons et al. | |
| 6,443,502 B1 * | 9/2002 | Iida et al. | 285/351 |
| 6,481,756 B1 * | 11/2002 | Field et al. | 285/124.1 |
| 6,652,008 B2 | 11/2003 | Fischer et al. | |

FOREIGN PATENT DOCUMENTS

| | | |
|---|---|---|
| EP | 1065425 A2 | 1/2001 |
| FR | 2349782 | 11/1977 |
| GB | 2283070 A | 4/1995 |
| WO | WO 2004/023016 A2 | 3/2004 |

* cited by examiner

CONNECTIONS FOR TUBING AND METHOD OF CONNECTING TUBING SEGMENTS

BACKGROUND OF THE INVENTION

1. Field of the Invention

The present invention relates generally to couplings for fluid flow components.

2. State of the Art

Numerous industries and many applications utilize metallic tubes, fittings, and various other "plumbing" components for handling and controlling critical fluid flow. Such components may be made of copper, stainless steel, and steel. Where the fluids being handled are under significant pressure or where containment integrity is critical, seals such as O-rings and flexible flat gaskets are typically utilized.

In particular applications such as semiconductor processing, the fluids involved react with and/or may be contaminated by the use of metallic components and conventional gaskets and elastomeric O-rings. Thus, in such industries, plumbing components are made of highly inert materials such as fluoropolymers, i.e., PFA and PTFE, for wetted components. In such applications, elastomeric O-rings are typically formed of two materials with a first traditional elastomeric material, such as silicon, encapsulated in a fluoropolymer coating. These O-rings are expensive and are subject to degradation and are typically considered to be suited for only a single use.

Various fluoropolymer-based fittings and couplings have evolved for making connections between fluoropolymer components that do not utilize O-rings. Referring to FIG. 1, one typical type of fitting is known in the industry as a FLARETEK® fitting. FLARETEK® is a registered trademark of Fluoroware, Inc. of Chaska, Minn. In such a fitting 30, the elongate tapered nose section 32 with a threaded neck 34 engages within a tubular end portion 36 which is flared to fit over the tapered nose section 32. The flared section 38 will have an inside cylindrical surface 40 that has an inside diameter sized for the outside diameter of an outside cylindrical surface 42 of the nose section 32. The nose section 32 thus "telescopes" into the flared section 38. A threaded nut 44 is used to tighten the flared section 38 onto the nose, creating a seal 46 between the fitting body and the flared portion of the tubing portion. The flared end of the tubing is generally formed by heating the tubing and shaping the heated malleable tubing end into the desired flared configuration using steel forms.

Various other types of fluoropolymer fittings are known in the art. Some utilize separate gripper portions or internal ferrules. See, for example, U.S. Pat. Nos. 3,977,708 and 4,848,802. For connections between fluoropolymer valves and components such as fluoropolymer manifolds, sealing integrity between the components is typically accomplished by gaskets or fluoropolymer covered O-rings. In certain instances annular tongue-in-groove connections without O-rings or gaskets have been successfully utilized. These connections have the disadvantage that they must be precisely machined, i.e., tolerances of 0.0005 inch, and it can be difficult to properly align the mating pieces. Moreover, such connections are vulnerable to nicks and scratches, which can compromise the integrity of the connection. Such a tongue-in-groove fitting is illustrated by U.S. Pat. No. 5,645,301. All of these fittings include a flange having a circumferential edge that defines its outside diameter. The circumferential edge is threaded to accommodate threaded connection with a coupling nut.

As may also be appreciated, it would be advantageous to provide a flare fitting providing a flare port of a maximum size relative to a minimum outside diameter. The flares may thus be spaced closer together, reducing the overall size of a device or assembly including multiple couplings.

BRIEF SUMMARY OF THE INVENTION

One embodiment of the present invention comprises a coupling assembly having a male protruding portion extending from a component, the male protruding portion having an axis and a bore extending axially therethrough. A flared tube includes an end portion configured for receiving the male protruding portion therein. A cap may have a bore therethrough for receiving the flared tube, the cap having at least one attachment aperture therethrough. An attachment element may pass through the attachment aperture and secure the cap and the component.

In addition, a gripper ring may be disposed to encircle the flared tube, and secure the flared tube over the male protruding portion. The gripper ring may be located to encircle the flared tube along a frustoconical portion of the flared tube, or at the distal end of the end portion of the flared tube. The gripper ring may be formed to be integral with the cap, or the gripper ring may be a removable, separate component. The gripper ring may include a surface having a series of ridges for gripping a portion of an exterior surface of the flared tube. Alternatively, the gripper ring may include a plurality of inwardly facing bosses for mating with spaced apertures formed in the flared tube. In yet another alternative, the gripper ring may include a lip configured to mate with a radial groove within the exterior surface of the flared tube end portion. Also, the male protruding portion may include an enlarged region on the exterior thereof, for engaging with the flared tube end portion disposed thereover.

In another embodiment of the present invention, a coupling may include a plurality of male protruding portions extending from a component, each male protruding portion of the plurality having an axis and a bore extending axially therethrough. A plurality of flared tubes, each flared tube comprising a central passage and an end portion configured for receiving the male protruding portion may be included. The coupling may additionally include a cap having a plurality of bores therethrough, each bore configured for receiving a flared tube of the plurality, the cap having an attachment element configured to attach the cap to the component.

The attachment element may comprise threads on the cap, for example, disposed on an inside wall of the cap to threadedly attach the cap and the component. Alternatively, the attachment element may comprise bolts configured to extend through attachment apertures extending through the cap, the bolts being securable to threaded bores in the component.

In another aspect of the present invention, a structure for retaining a first tube segment within a second tube segment comprises a base, the first tube segment extending from a portion of the base, and a cap encircling the second tube segment, the cap attached to the base so as to form a space therebetween.

In yet another aspect of the present invention, a method of coupling a first tube segment with a second tube segment comprises providing a base structure, the first tube segment protruding therefrom, positioning the second tube segment with an end portion thereof receiving a portion of the protruding first tube segment, encircling a portion of the second tube segment with a cap, and attaching the cap to the base structure with at least one attachment element received in an attachment aperture of the cap and secured to the base structure.

BRIEF DESCRIPTION OF THE SEVERAL VIEWS OF THE DRAWINGS

The foregoing and other advantages of the present invention will become apparent upon review of the following detailed description and drawings in which.

DETAILED DESCRIPTION OF THE INVENTION

The coupling according to the present invention may be used in a variety of applications, such as for coupling pipe or tubing ends to items such as valves or manifolds, or for coupling a valve to a manifold.

Figure 2A:
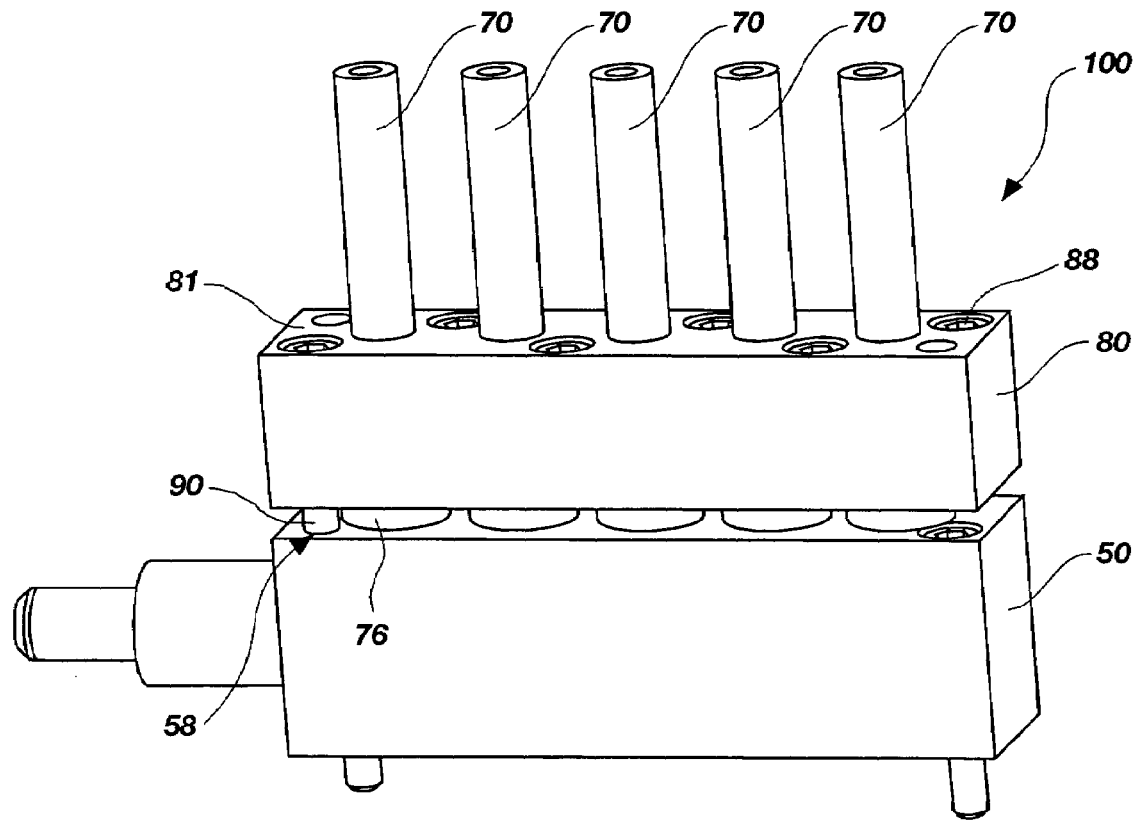
FIG. 2A shows a perspective view of a manifold including flare connections of the present invention.
Figure 2B:
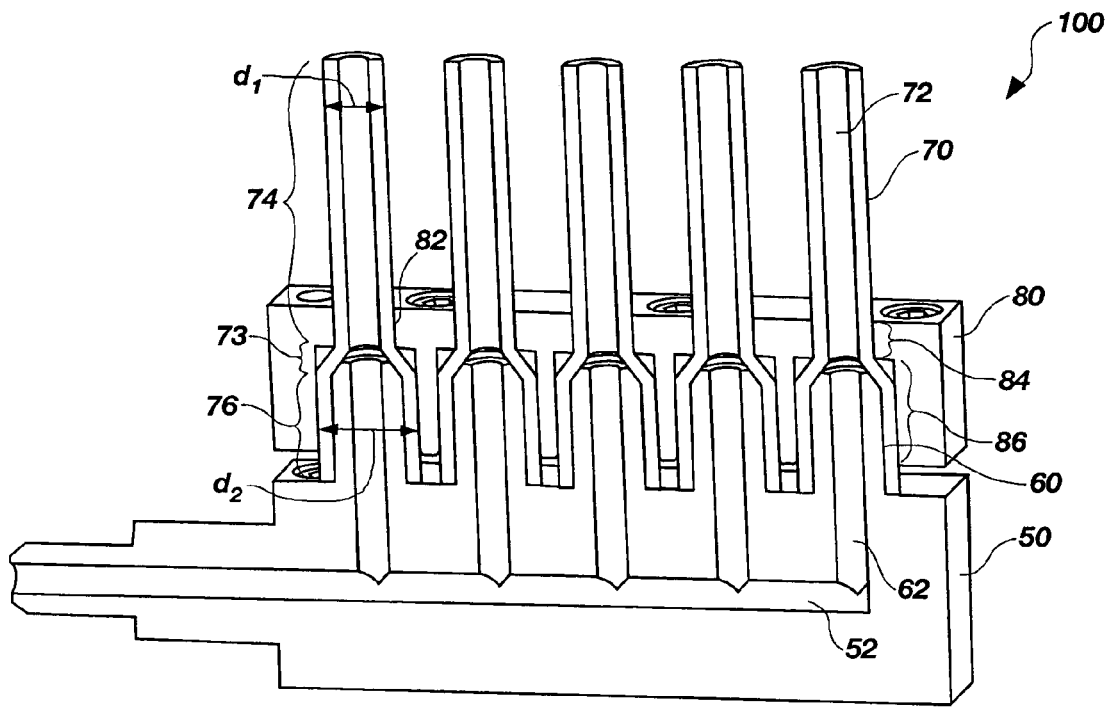
FIG. 2B shows a side cross-sectional view of the manifold shown in FIG. 2A.

A first embodiment of manifold 100 including a flare connection according to the present invention is depicted in FIG. 2A and in cross-section in FIG. 2B. The manifold includes a block 50 with a fluid flow path 52 extending therethrough. Five male protruding portions in the form of flare noses 60 protrude from the top of block 50. Each flare nose 60 has a bore 62 extending axially therethrough, each bore 62 in fluid communication with the fluid flow path 52 of the block 50. Five flared tubes 70 each include a central passage 72, a body 74 having a first outside diameter $d_1$ and an end portion 76 configured for receiving the flare nose 60, the end portion 76 having a second, greater outside diameter $d_2$. A frustoconical shoulder region 73 joins the body 74 and the end portion 76 of each flared tube 70, tapering radially outwardly between the body 74 and the end portion 76. A cap 80 having five bores 82 therethrough spaced and located for disposition over flare noses 60 is fitted over the five flared tubes 70. Each of the five flared tubes 70 is received within a bore 82 of the cap 80. Each bore 82 may have a first portion 84 having a diameter slightly larger than the first outside diameter $d_1$ of the flared tube body 74 to receive the flared tube body 74 therein, and a second portion 86 having a diameter slightly larger than the second outside diameter $d_2$ of the flared tube end portion 76 to receive the flared tube end portion 76 and shoulder region 73 therein.

Attachment apertures 88 may be provided through the cap 80, and attachment elements 90, for example pins, bolts or screws, may pass therethrough to secure the cap 80 to the block 50. The attachment apertures 88 may include a counterbore (not shown) on a first surface 81 of the cap 80; the first surface 81 being the surface distal from the manifold block 50. The counterbore may enable an attachment element 90 having a head to fit flush with the first surface 81 of the cap 80. The attachment elements 90 may have threaded end portions, and be respectively received within threaded apertures 58 of the manifold block 50. Alternatively, the attachment elements 90 may protrude from the manifold block 50, pass through the attachment apertures 88 of the cap, and be secured, for example with a nut (not shown), disposed over the end thereof on the cap 80. In yet another alternative the attachment elements 90 may extend through the manifold block 50 and attach to a third object, for example a mounting surface for the manifold block 50, or a nut. The attachment elements 90 may be threadedly attached to the third object.

As noted above, the flare noses 60 are male portions protruding from the block 50 of the manifold. The flared tube end portions 76 are female portions, receiving the flare noses 60 therein. The cap 80 serves to secure the flared tubes 70 to the flare noses 60. The cap 80 may engage the flared tube end portions 76 with the flared tubes 70 received within the bores 82 therethrough. The greater outside diameter $d_2$ of the flared tube end portion 76 prevents the flared tube end portion 76 from passing through the first portion 84 of the bore 82, which is sized to fit the outside diameter $d_1$ of the flared tube body 74. The cap 80, when secured to the manifold block 50 with the attachment elements 90, thus secures the flared tubes 70 to the flare noses 60.

Figure 1:
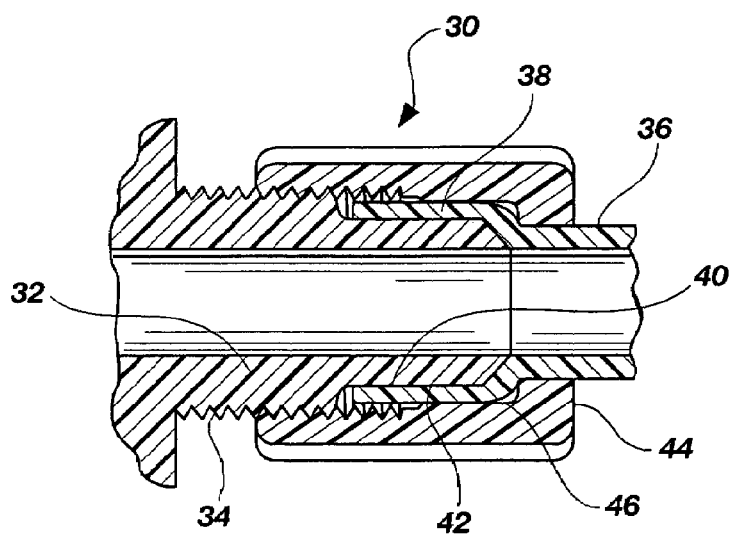
FIG. 1 shows a conventional flare connection.

The bores 82 of the cap 80 are not threaded to secure the cap 80 to the manifold block 50; therefore, the flare noses 60 may be spaced in closer lateral proximity than the flare noses of a conventional manifold employing conventional couplings, which are individually threaded on their exteriors, as shown in FIG. 1. Referring back to FIG. 2A, the cap 80 of the present invention may be configured with the bores 82 for receiving the flared tubes 70 in a line, with the attachment apertures 88 offset from the line and staggered on opposing sides of the line of bores 82, enabling the flare noses 60 and the flared tubes 70 to be closely spaced. A wall of the bore 82 may be smooth to fit substantially flush against the side of the flared tubes 70. Bores 82 having bore walls free from irregularities, roughness, or projections enable the cap 80 to fit tightly about the flared tubes 70, and the flared tubes 70 may be relatively closely spaced in comparison to conventional manifold assemblies. Alternatively, the flared tubes 70 are not arranged in a line, but may be staggered, for example, or arranged in a circular formation.

It will be understood that a flare connection between a component having only a single flare nose 60 and a single flared tube 70 is within the scope of the invention, as well as a component having any number of flare noses 60. The flare connection may be used to connect tubes or other components which may be used to transport liquids or gases in a fluid-tight manner. The flare nose 60 and flared tube 70 may be formed of any material capable of accommodating the types of fluids, pressures, temperatures, etc. to which the tube coupling assembly will be exposed. Suitable materials include, but are not limited to, polymeric materials such as fluoropolymeric compounds such as tetrafluoroethylene (TFE), polytetrafluoroethylene (PTFE), fluorinated ethylene-propylene (FEP), perfluoroalkoxy fluorocarbon resin (PFA), polychlorotrifluoroethylene (PCTFE), ethylene-chlorotrifluoroethylene copolymer (ECTFE), ethylene-tetrafluoroethylene copolymer (ETFE), polyvinylidene fluoride (PVDF), and polyvinyl fluoride (PVF). Other suitable materials include polyvinyl chloride (PVC), chlorinated polyvinyl chloride (CPVC), polypropylene, polyethylene, high density polyethylene, acrylonitrile butadiene styrene (ABS), a thermal setting plastic, a thermal plastic, or a plastic with property enhancing additives. The cap 80 may be formed from similar materials and ETFE, a more rigid material, may be particularly suitable for such application.

Figure 2C:
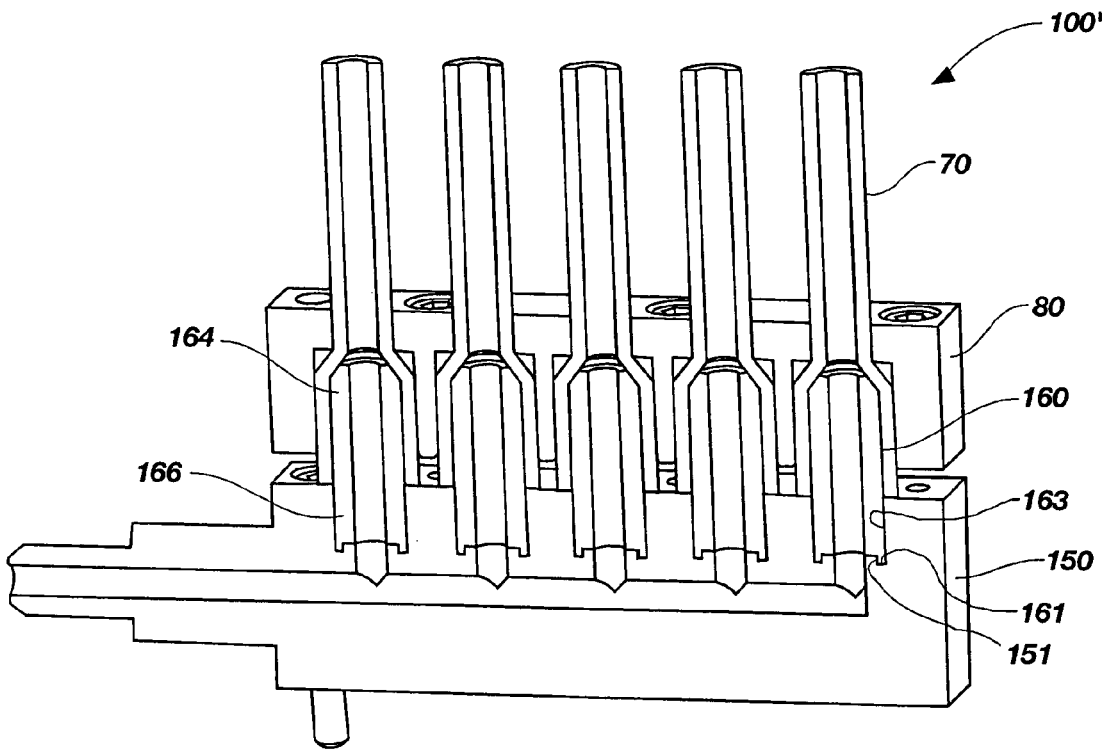
FIG. 2C depicts a side cross-sectional view of a manifold according to the present invention having replaceable flare noses.

FIG. 2C depicts a manifold 100' including a flare connection according to the present invention, as depicted in FIGS. 2A and 2B. However, the flare noses 160 of the manifold 100' depicted in FIG. 2C are formed as components separate from the body of manifold 100' and, therefore, are replaceable. The flare noses 160 may be hollow cylinders, with an upper portion 164 to be received by the flared tubes 70. A lower portion 166 is received with a bore 163 of the block 150. The lower portions 166 of the flare noses 160 each have a raised, projecting, annular circumferential edge 161 which is sized and configured to engage an annular groove 151 in the bore 163 of the block 150. This tongue-and-groove-type fitting enables the flare noses 160 to be removed and replaced when worn or damaged. The tongue-and-groove-type fitting may be an interference fit such that, when mated, the raised circumferential edge 161 and annular groove 151 efficiently seal the flare nose 160 with the manifold block 150.

Figure 2D:
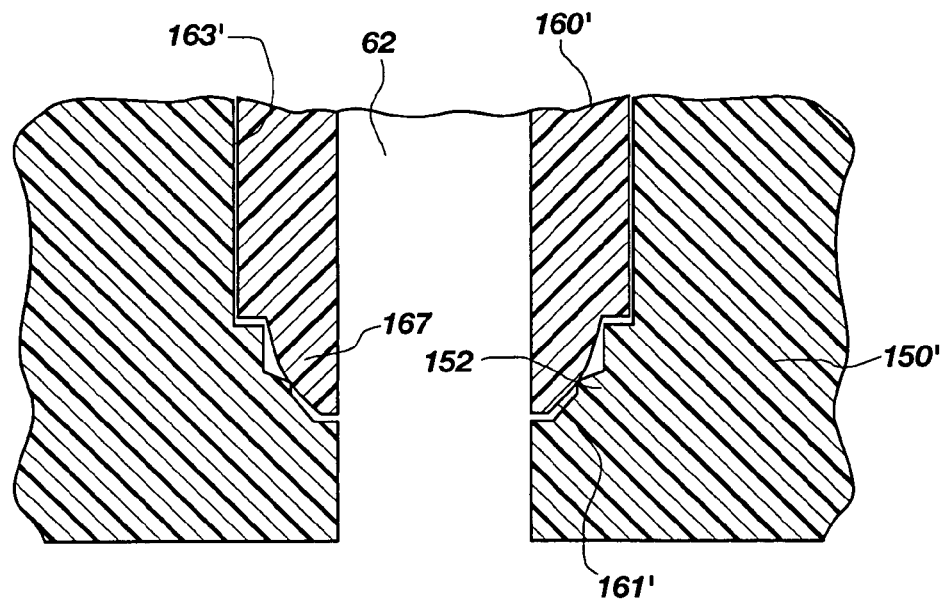
FIG. 2D shows a close-up view of a replaceable flare nose according to the present invention.

Replaceable flare noses 160' may be sealed to a block 150' with a seal as depicted in FIG. 2D rather than the tongue-and-groove fitting illustrated in FIG. 2C. The block 150' includes a bore 163' having a radially and inwardly projecting integral annular ring 152. The radially and inwardly projecting integral annular ring 152 may engage with an exterior surface 161' of a distal end 167 of the lower portion of the flare nose 160'. When the cap 80 is fitted over the flared tubes 70, and secured to the block 150, as shown in FIG. 2C, the distal end 167 of the replaceable flare nose 160' is sealed against the radially and inwardly projecting integral annular ring 152.

Figure 3:
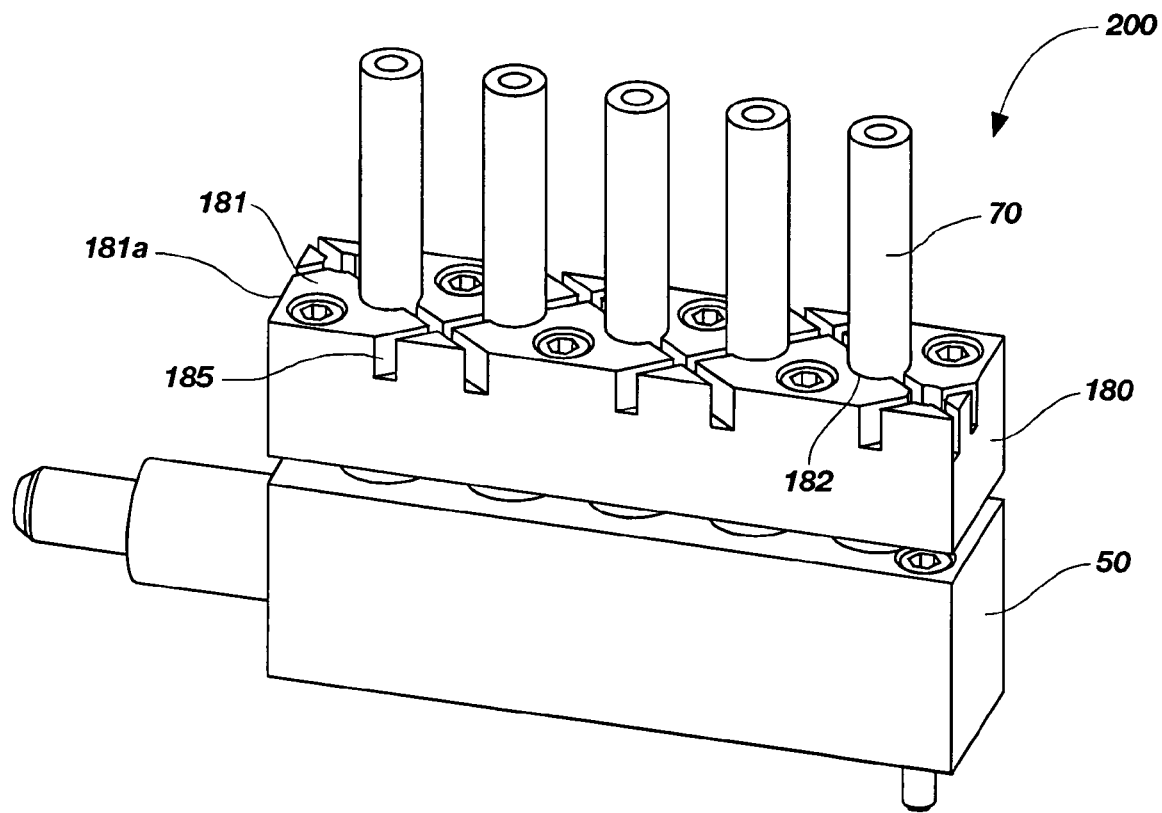
FIG. 3 shows a side perspective view of a second embodiment of a manifold according to the present invention.

In a second embodiment of the present invention, depicted in FIG. 3, a manifold 200 includes a cap 180 having a plurality of slits 185 therethrough. The slits 185 may cross a first surface 181 of the cap at acute and obtuse angles to a perimeter edge 181 a of the first surface 181, the first surface 181 being the surface farthest from the manifold block 50. The slits 185 may extend from the first surface 181 to a predetermined depth within the cap. The predetermined depth may be substantially the same as the depth of a first portion of the bore 182 within the cap 180, the bore first portion being sized to accommodate the flared tube portion of body 74, and having a diameter smaller than the diameter of the flared tube end portion 76. Referring back to the cross-section of the manifold 100 shown in FIG. 2B, the first portion 84 of the cap 80 is depicted. The slits 185 may pass through and be open to the first portion of the bore 182, enabling the cap 180 to grip each flared tube 70 evenly. The polymer material of the cap 180 and the flared tubes 70 may bend, twist, grow, or shrink over time, or under different environmental conditions, and the slits 185 may enable the cap 180 to flex, providing a better seal between the flare nose 60 and flared tube 70. In addition, if one attachment element 90 is tighter than the other attachment elements 90, the slits 185 enable the cap 180 to flex, preventing the cap from clenching more tightly on one side of a proximate flared tube 70.

Figure 4A:
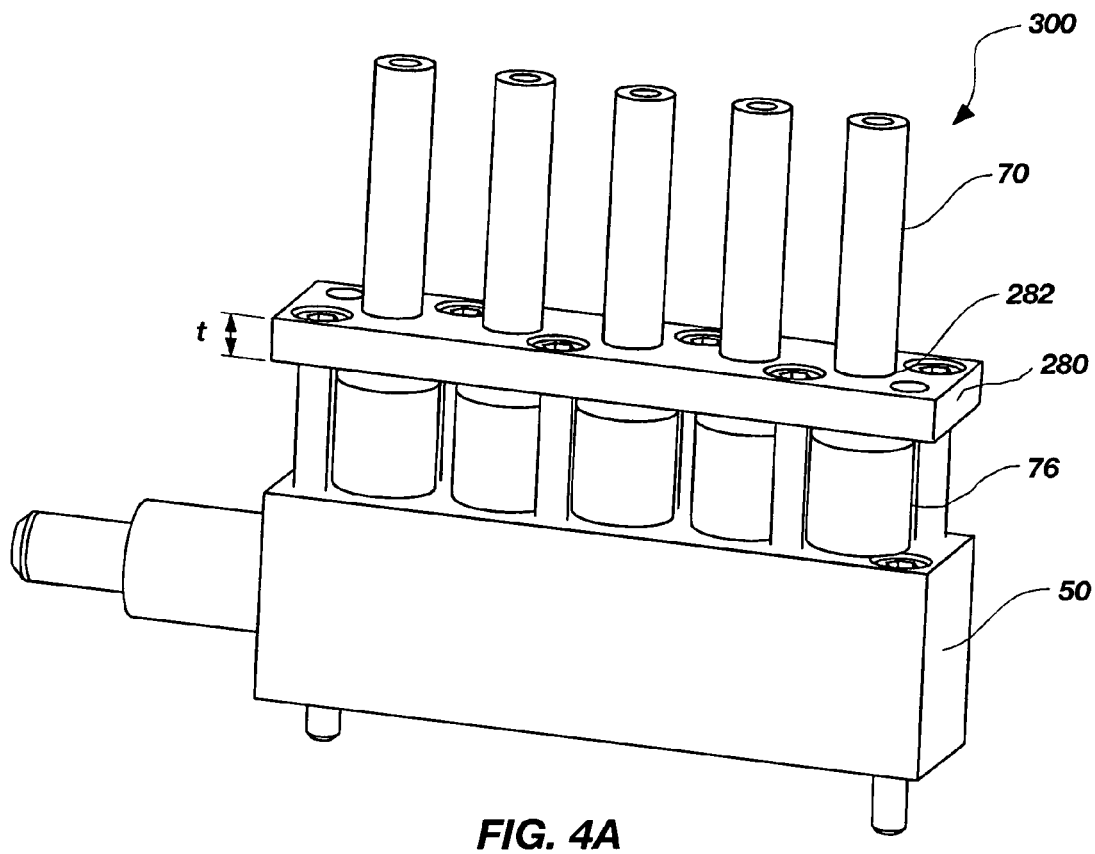
FIG. 4A shows a perspective view of a third embodiment of a manifold according to the present invention.
Figure 4B:
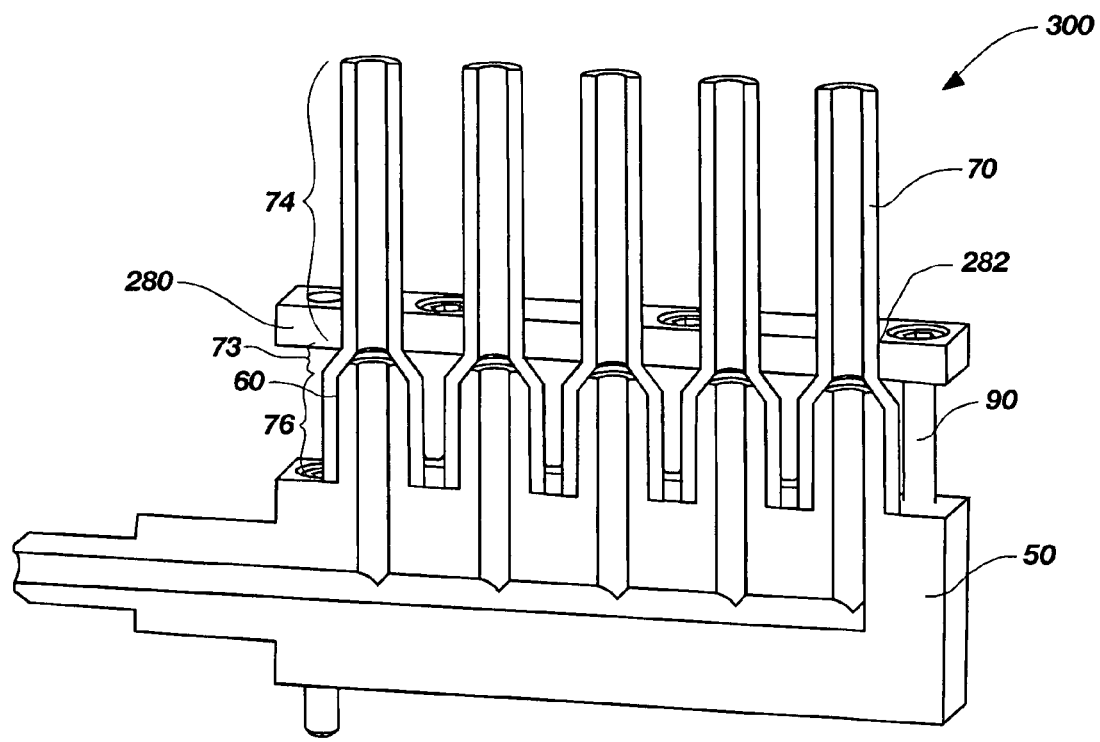
FIG. 4B shows a side cross-sectional view of the manifold shown in FIG. 4A.

In a third embodiment of the present invention, illustrated in FIGS. 4A and 4B, a manifold 300 includes a cap 280 having bores 282 sized to encompass a longitudinal portion of the flare nose body 74. The cap 280 engages with the flared tube shoulder regions 73 but does not encompass the shoulder region 73 or the flared tube end portions 76. The cap 280 may have a thickness t less than the thickness of the cap 80 depicted in FIGS. 2A through 2C. Alternatively, the thickness t of the cap 280 may be similar to the thickness of the cap 80 depicted in FIGS. 2A through 2C, and the cap 80 may encompass a longer longitudinal portion of the flare nose body 74. A greater length of the attachment elements 90 is thus exposed with the cap 280, depicted in FIGS. 4A and 4B, as opposed to the length of the attachment elements 90 exposed with the cap 80 depicted in FIGS. 2A through 2C.

Figure 5:
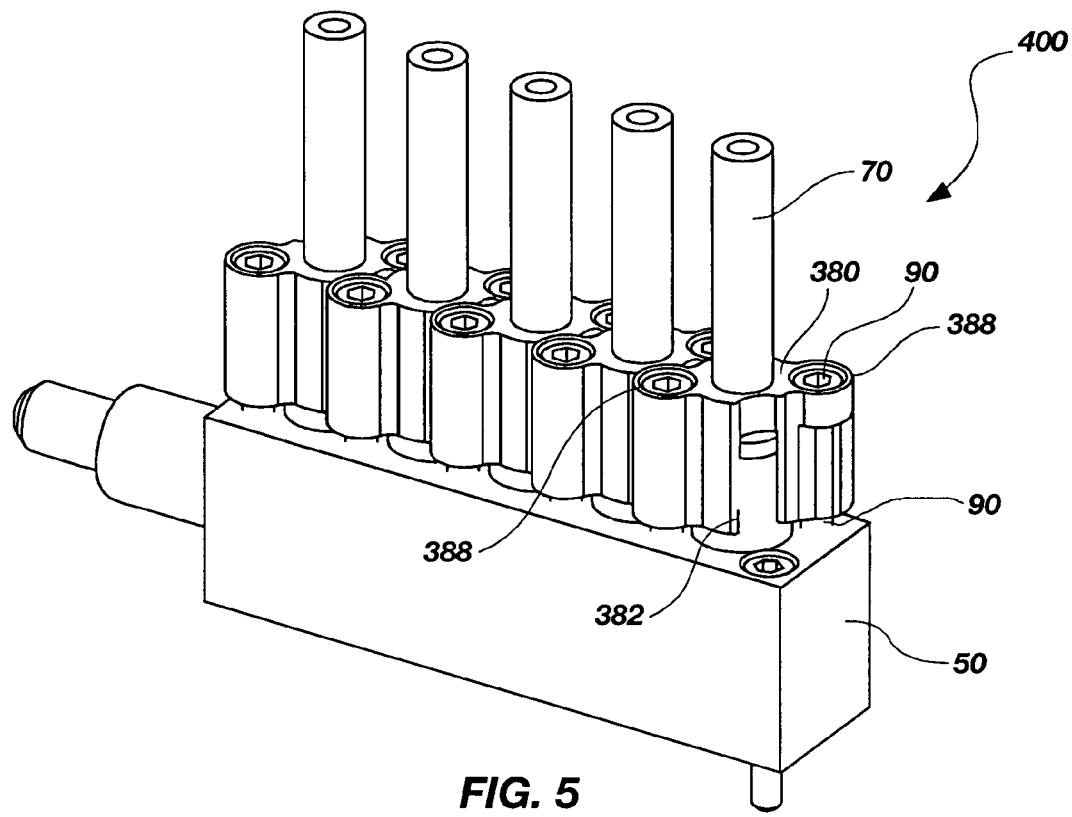
FIG. 5 shows a perspective view of a fourth embodiment of a manifold according to the present invention.

In a fourth embodiment of the present invention, illustrated in FIG. 5, a manifold 400 may have a plurality of caps 380 secured thereto. Each cap 380 may have a single bore 382 to secure a single flared tube 70 to a corresponding, single flare nose (not shown). The bore 382 is not threaded, enabling the flared tubes 70 to be closely spaced. For example, the manifold block 50 includes five flare noses (not shown) for attachment to the five flared tubes 70. Only three flare noses and flared tubes attached using conventional means, for example the threaded fitting 30 depicted in FIG. 1, fit on a manifold of the same size because the threaded fitting 30 requires the flare noses to be laterally spaced farther apart. Returning to FIG. 5, each cap 380 may additionally include two attachment apertures 388 for securing the cap 380 to the block 50 with attachment elements 90. The individual caps 380 may encompass the flared tube shoulder region 73 and a substantial portion of the flared tube end portion 76 as shown, or the individual caps may encircle only the flared tube body 74, similar to the third embodiment depicted in FIGS. 4A and 4B.

Figure 6:
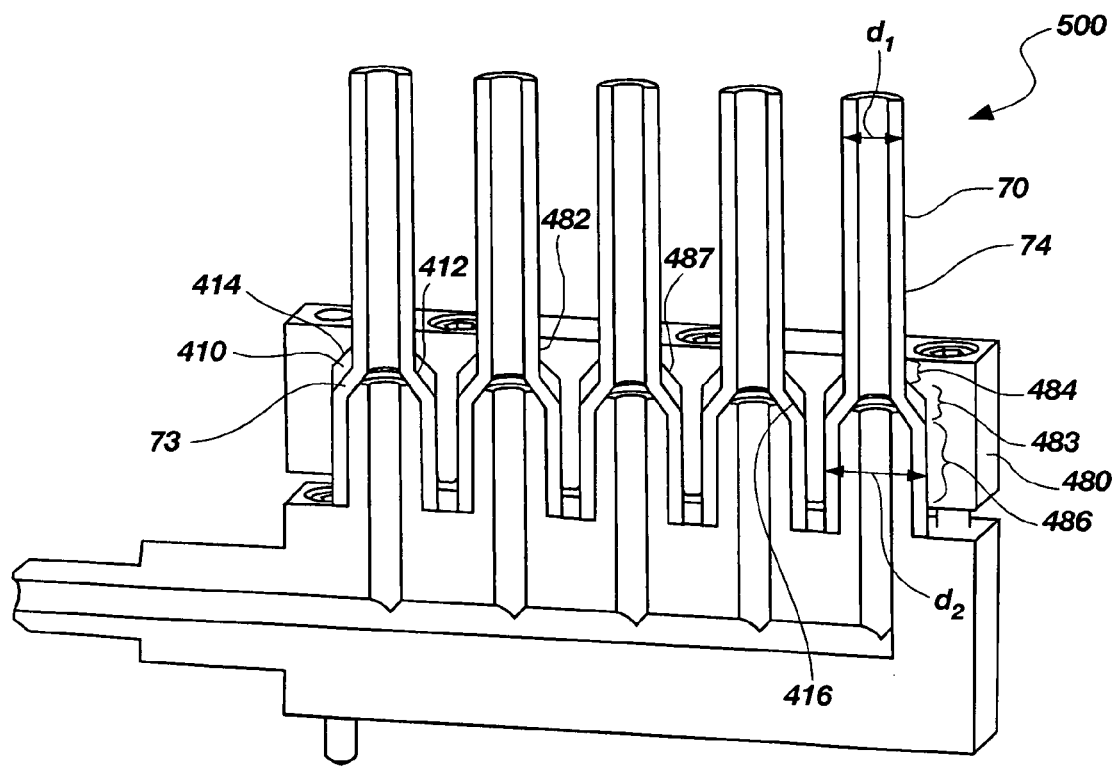
FIG. 6 shows a side cross-sectional view of a fifth embodiment of a manifold according to the present invention.

In a fifth embodiment of the present invention, depicted in FIG. 6, a cap 480 of a manifold 500 includes tapered, annular grippers 410 of a generally frustoconical configuration. The bore 482 within the cap includes a first portion 484 having a diameter slightly larger than the first outside diameter $d_1$ of the flared tube body 74 to receive the flared tube body 74 therein, and a second portion 486 having a diameter slightly larger than the second outside diameter $d_2$ of the flared tube end portion 76 to receive the flared tube end portion 76 therein. A central portion 483 of the bore, positioned between the first portion 484 and the second portion 486 includes sloped sidewalls 487, as the bore 482 tapers from the larger diameter second portion 486 to the smaller diameter first portion 484. The tapered, annular gripper 410 is fitted within the central portion 483 of the bore 482, and may include a passageway 412 therethrough to accommodate the flared tube 70. A shoulder surface 414 of the tapered, annular gripper 410 may abut the sloped sidewalls 487 of the bore. An opposing, underside surface 416 of the tapered, annular gripper 410 may abut the flared tube shoulder region 73. The underside surface 416 of the tapered, annular gripper 410 may have a plurality of annular ridges or other suitable irregular surface topography to seize the surface of the flared tube 70, as described in further detail hereinbelow, with respect to FIG. 7B.

Figure 7A:
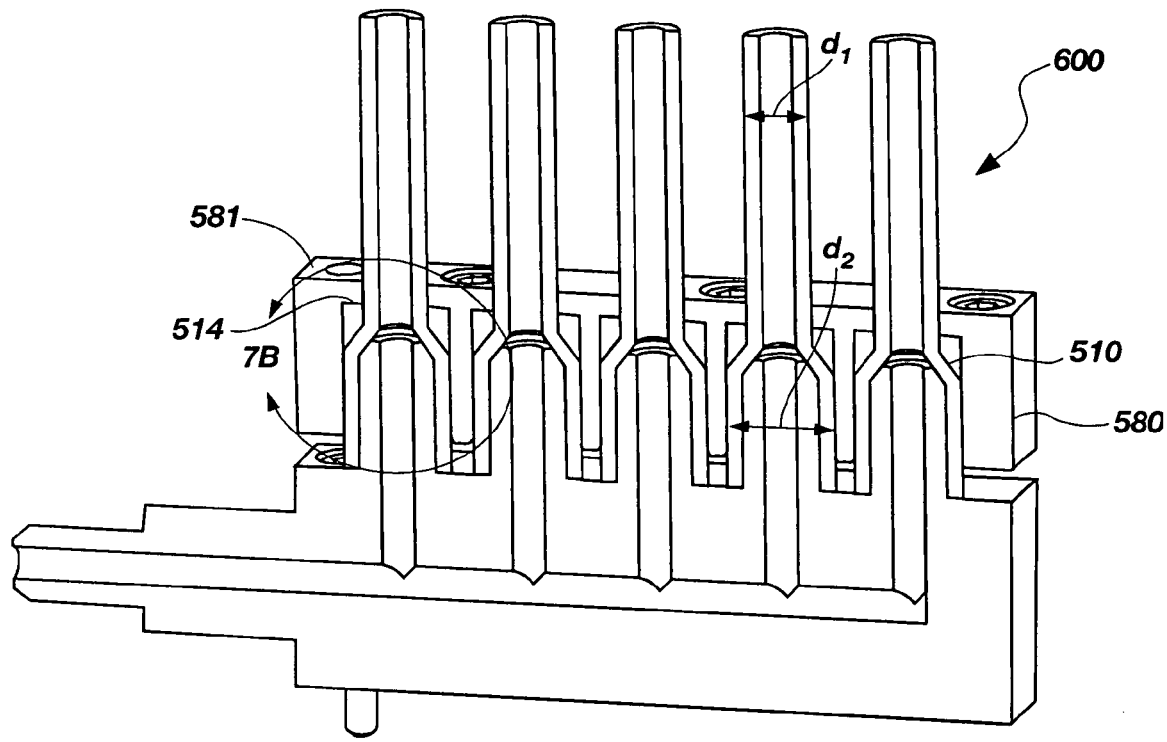
FIG. 7A shows a side cross-sectional view of a sixth embodiment of a manifold according to the present invention.
Figure 7B:
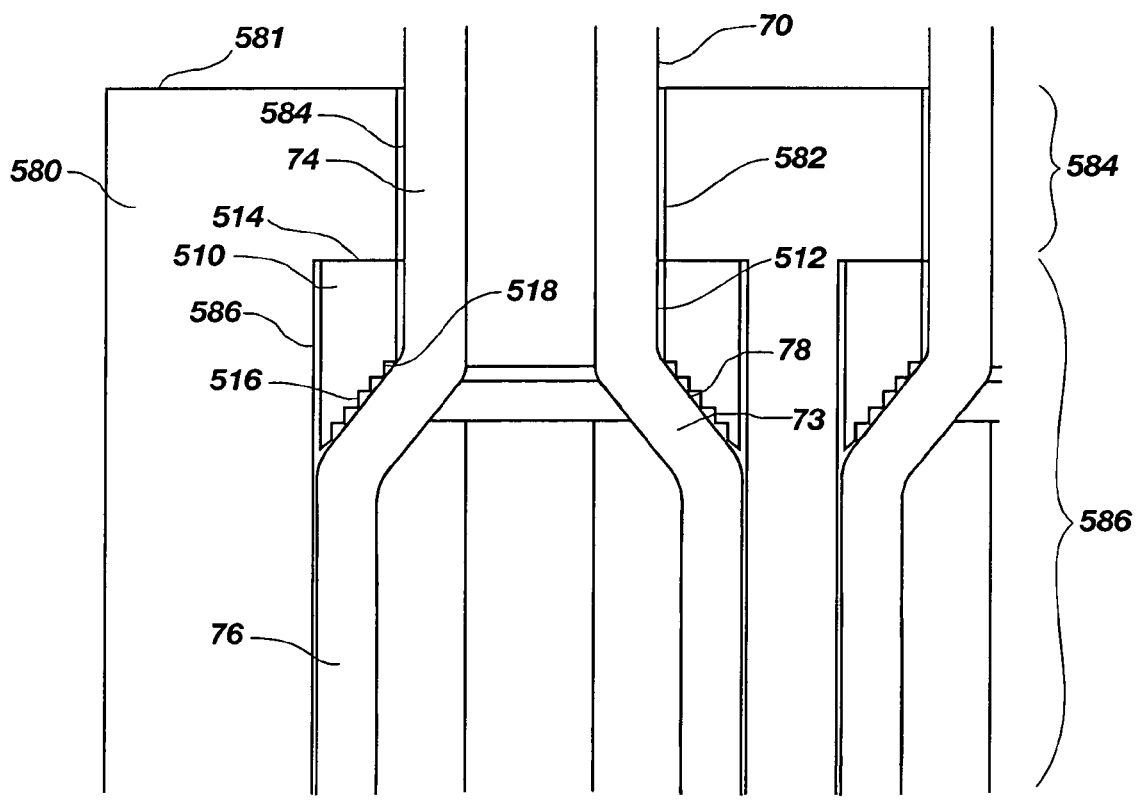
FIG. 7B shows an enlarged portion of the manifold shown in FIG. 7A.

A sixth embodiment of the present invention is shown in FIGS. 7A and 7B. A manifold 600 has a cap 580 including annular grippers 510 having a shoulder surface 514 parallel with a top surface 581 of the cap 580. A bore 582 of the cap 580 includes a first portion 584 having a diameter substantially similar to the first outside diameter $d_1$ of the flared tube body 74 to receive the flared tube body 74 therein, and a second portion 586 having a diameter substantially similar to the second outside diameter $d_2$ of the flared tube end portion 76 to receive the flared tube end portion 76 therein. The annular gripper 510 may be received by the bore second portion 586, and the annular gripper 510 may include a passageway 512 therethrough having a diameter substantially similar to the bore first portion 584, to receive the flared tube body 74 therein. An underside surface 516 of the annular gripper 510 may include a plurality of annular ridges 518, arranged in a stair-step to approximate the angle of a surface 78 of the flared tube shoulder region 73. The plurality of annular ridges 518 may seize the flared tube shoulder surface 78, retaining the flared tube 70 in place within the cap 580.

Figure 8:
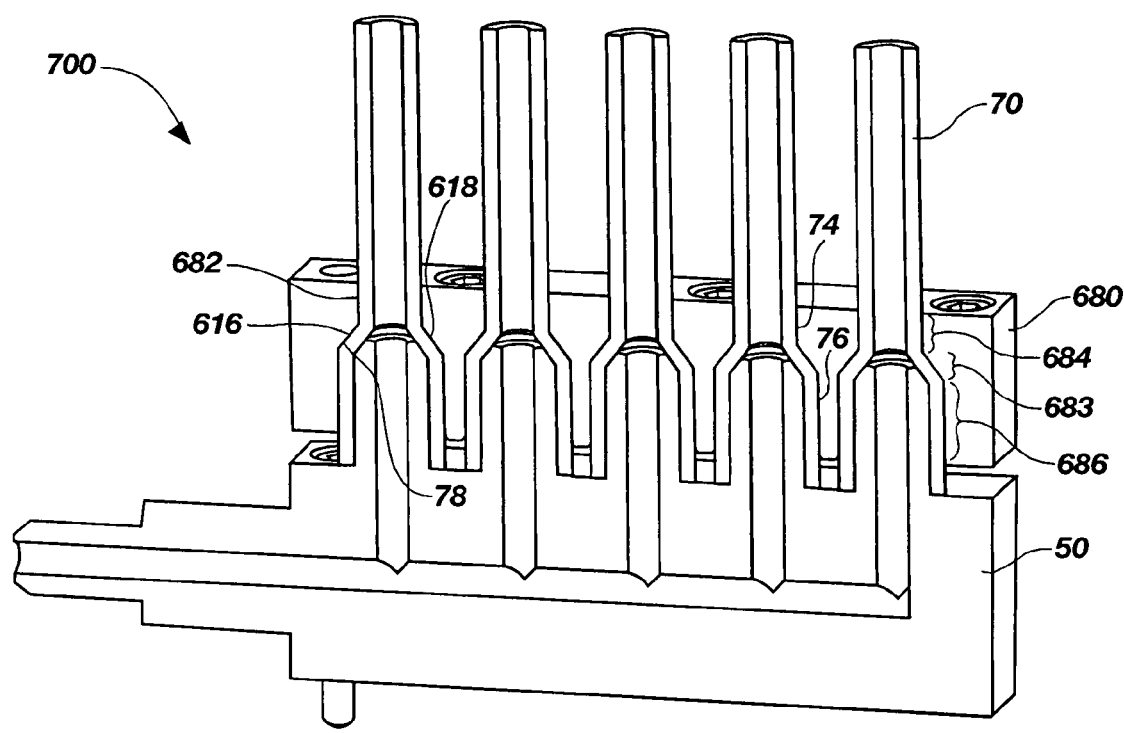
FIG. 8 shows a side cross-sectional view of a seventh embodiment of a manifold according to the present invention.

A seventh embodiment of the present invention is depicted in FIG. 8. A cap 680 of a manifold 700 includes an integral gripper. A bore 682 of the cap 680 includes a first portion 684 for receiving the flared tube body 74, a central portion 683, and a second portion 686 for receiving the flared tube end portion 76. The central portion 683 may have a plurality of cross-sectional diameters of incrementally radially outwardly increasing magnitude from the diameter of the first portion 684 to the diameter of the second portion 686 to provide a substantially frustoconical surface. A sidewall 616 of the bore central portion 683 includes a plurality of annular ridges 618, arranged in a stair-step to approximate the angle of the shoulder surface 78 of the flared tube 70 and form an integral gripper. Thus, the cap 680, having an integral gripper, may seize the flared tube shoulder surface 78, retaining the flared tube 70 in place.

Figure 9A:
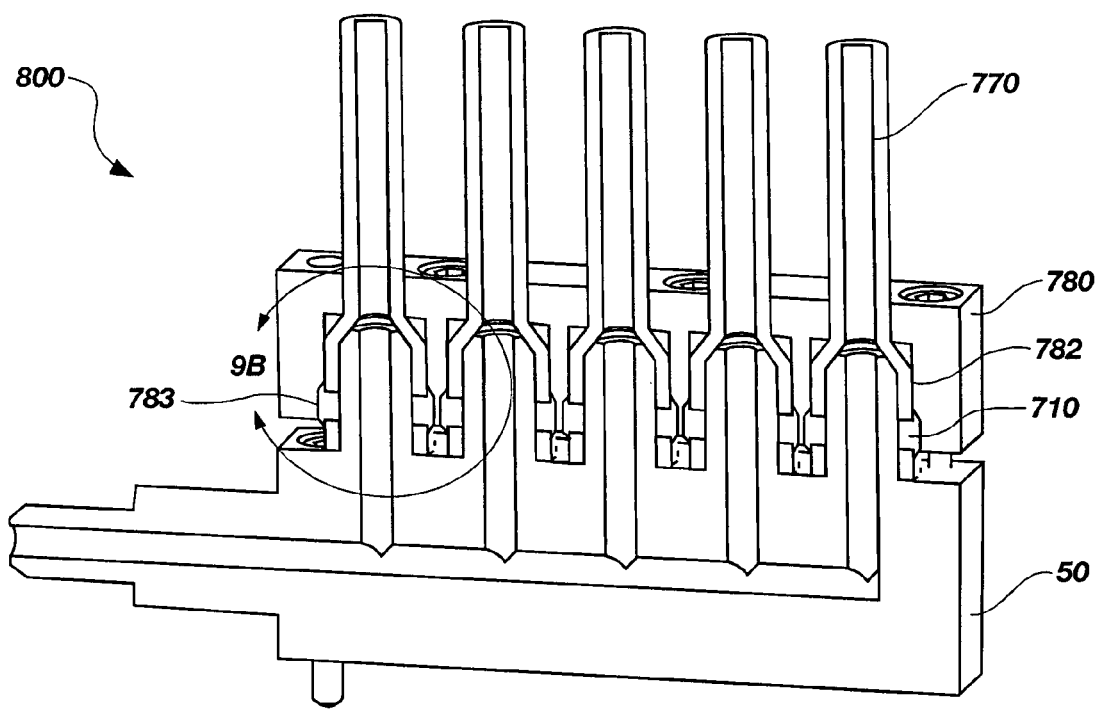
FIG. 9A shows a side cross-sectional view of an eighth embodiment of a manifold according to the present invention.
Figure 9B:
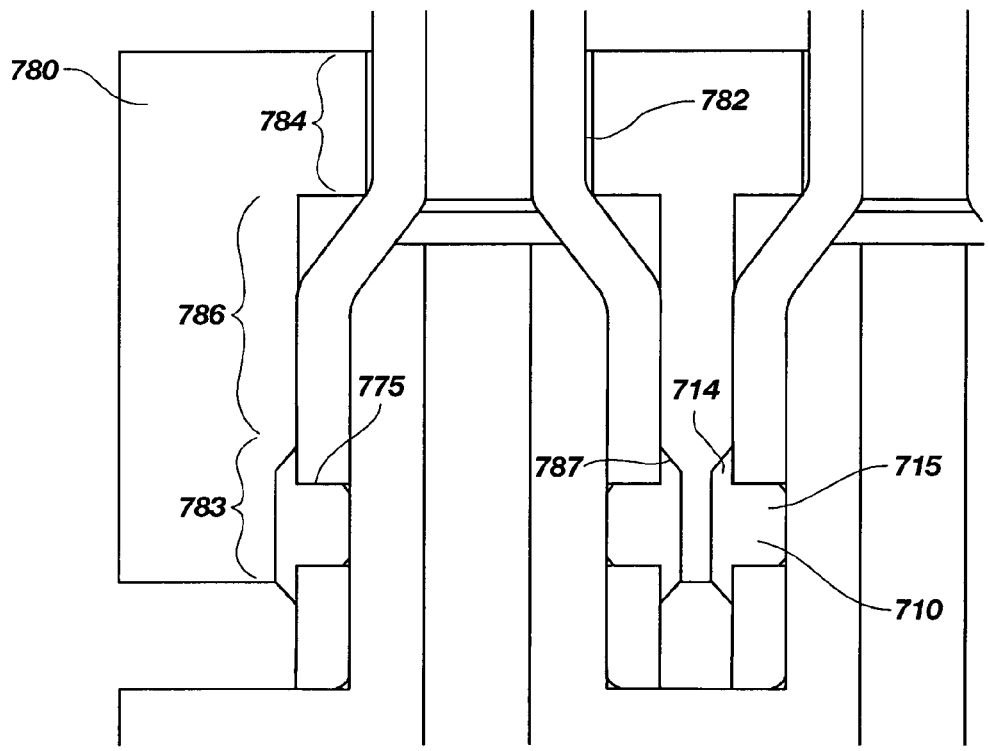
FIG. 9B shows an enlarged portion of the manifold shown in FIG. 9A.
Figure 9C:
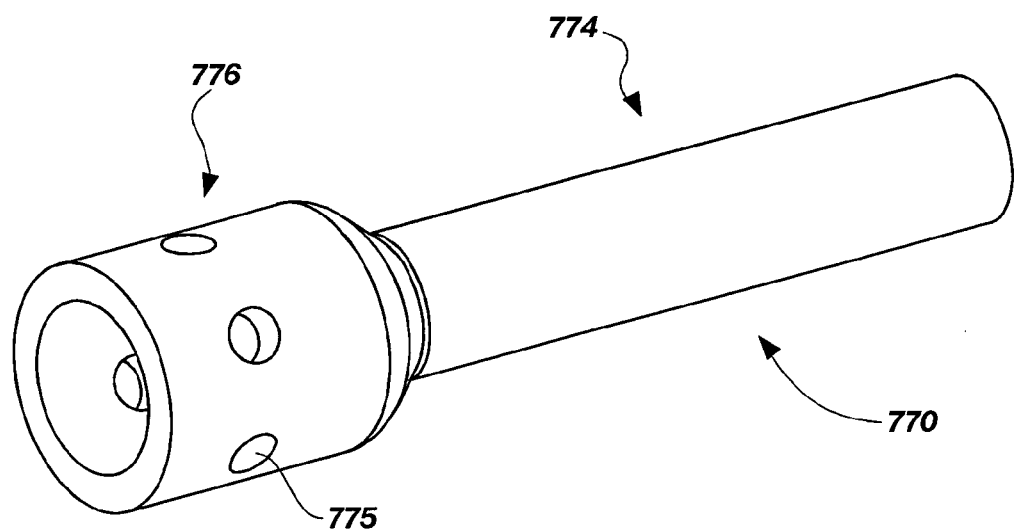
FIG. 9C shows a perspective view of the flare tubing of FIG. 9A.
Figure 9D:
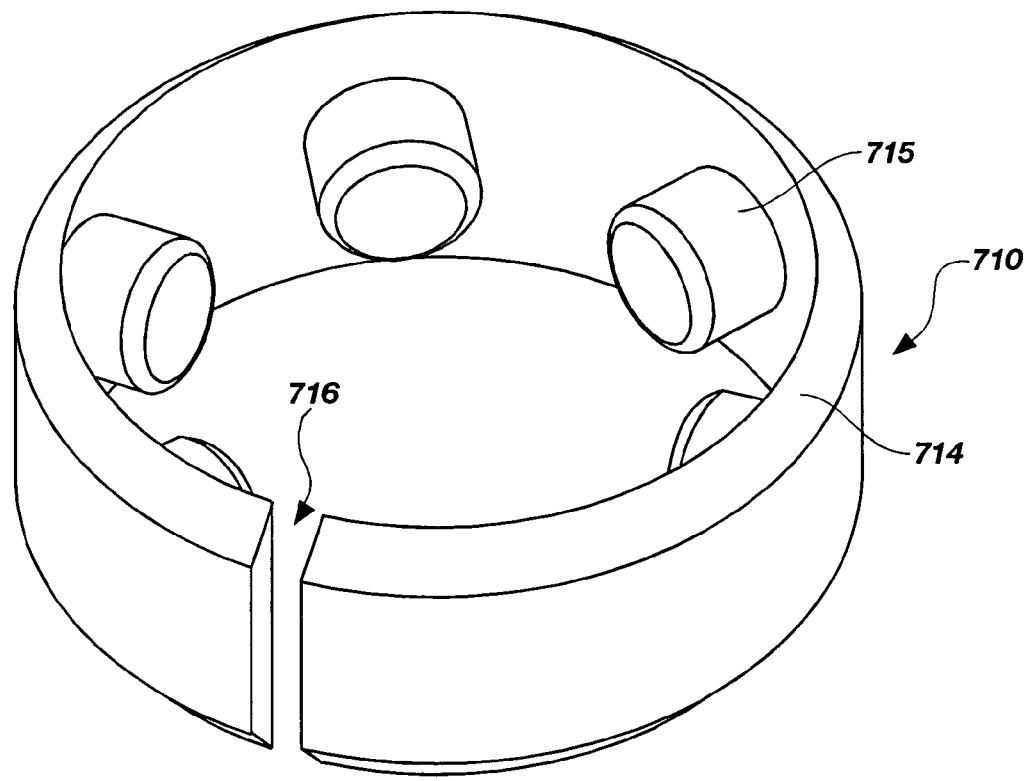
FIG. 9D shows a perspective view of the gripper of FIG. 9A.

In an eighth embodiment of the present invention, depicted in FIGS. 9A-9D, a gripper ring 710 may be included in a manifold 800 for each flared tube 770. The gripper ring 710 may be a split ring, as described in U.S. Pat. No. 6,402,206 to Simmons et al., herein incorporated by reference. The gripper ring 710 may fit within an internal annular recess 783 of the cap 780 to retain a flared tube 770 in fluid-sealing engagement on the smaller diameter flare nose 60 of the block 50 of the manifold. The gripper ring 710 may include a plurality of radially inwardly facing bosses 715 for engaging respectively spaced apertures 775 in the flared tube end portion 776, as shown in FIGS. 9C and 9D. The bosses 715 may serve to lock the flared tube 770 around the flare nose 60. More specifically, the gripper ring 710 may prevent the flared tube 770 from being withdrawn from the cap 780, as the cap 780 is fastened to or withdrawn from the main block 50 of the manifold 800, with the gripper ring bosses 715 fitting into the respective flared tube end portion spaced apertures 775.

The gripper ring 710 may have a tapered upper edge 714 to help force the gripper ring 710 tightly against the flared tube 770 and prevent binding of the gripper ring 710 between cap 780 and a flared tube 770. The tapered edge 714 may abut a tapered upper shoulder 787 of the internal annular recess 783 within the cap 780 when assembled therewith. The internal annular recess 783 may comprise a portion of a bore 782 through the cap 780 most proximate the manifold block 50. Thus, the bore 782 may comprise a first portion 784 to receive the flared tube body 774 therein, a second portion 786 to receive the flared tube end portion 776 therein, and a third portion, the internal annular recess 783, having a slightly larger diameter, to accommodate the gripper ring 710. Tightening the cap 780 against the manifold block 50 will force the tapered shoulder 787 of the internal annular recess 783 against the tapered edge 714 of the gripper ring 710, pressing the gripper ring 710 against the flared tube 770 as the portion of cap 780 surrounding each recess 783 prevents radially outward movement or extrusion of gripper ring 710.

As noted above, the gripper ring 710 may be an annular ring having a split 716 therein. The split 716 may enable the gripper ring 710 to expand or be compressed, as needed, to engage the flared tube 770 within the cap 780.

Figure 10A:
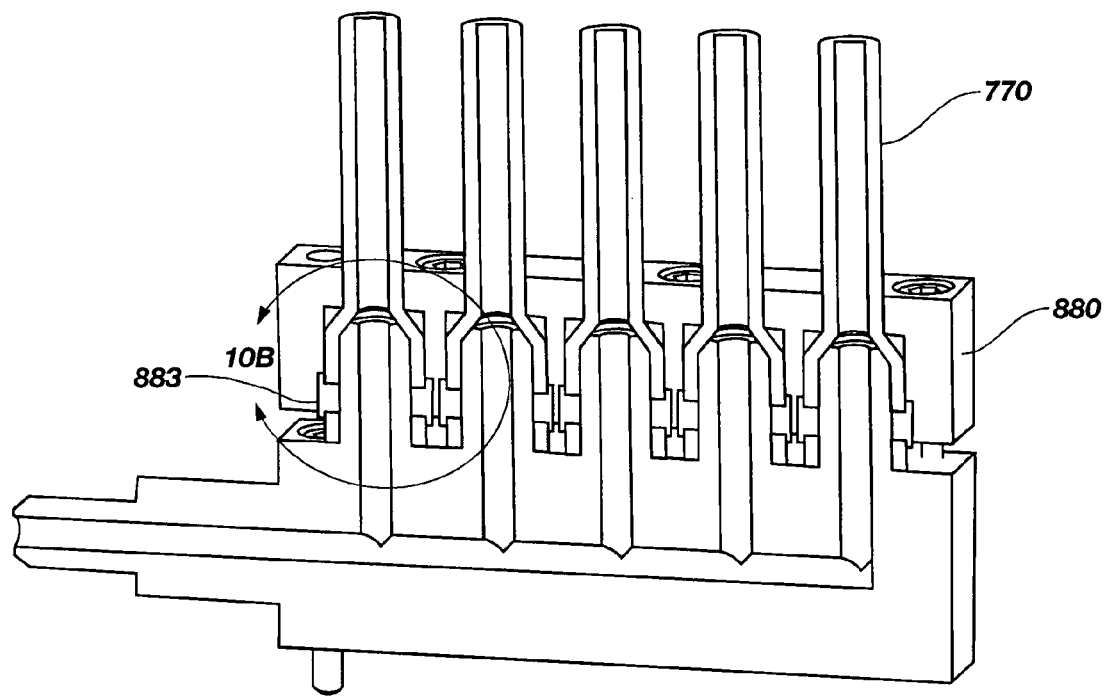
FIG. 10A shows a side cross-sectional view of a ninth embodiment of a manifold according to the present invention.
Figure 10B:
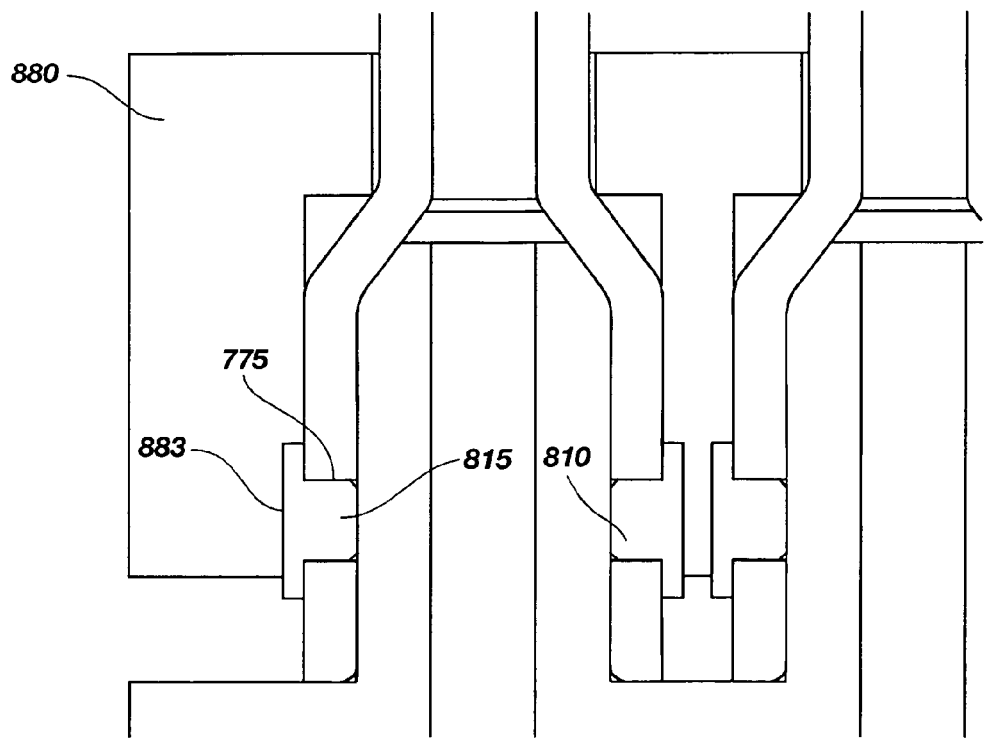
FIG. 10B shows an enlarged portion of the manifold shown in FIG. 10A.

In a ninth embodiment of the present invention, depicted in FIGS. 10A and 10B, a gripper ring 810 may engage with the spaced apertures 775 of the flared tube 770, in a manner similar to the gripper ring 710 of the eighth embodiment, depicted in FIGS. 9A-9D. The gripper ring 810 may have a generally rectangular cross-section, except in the areas of the bosses 815. The internal annular recess 883 of the cap 880 may thus be formed as simple counterbores of constant diameter.

Figure 11A:
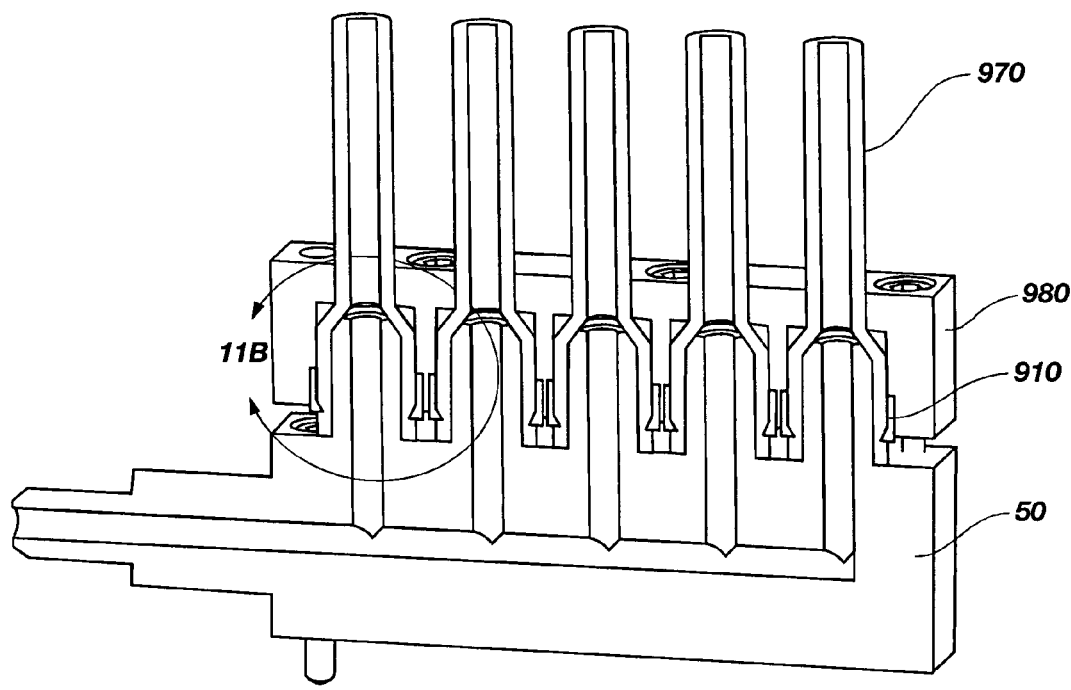
FIG. 11A shows a side cross-sectional view of a tenth embodiment of a manifold according to the present invention.
Figure 11B:
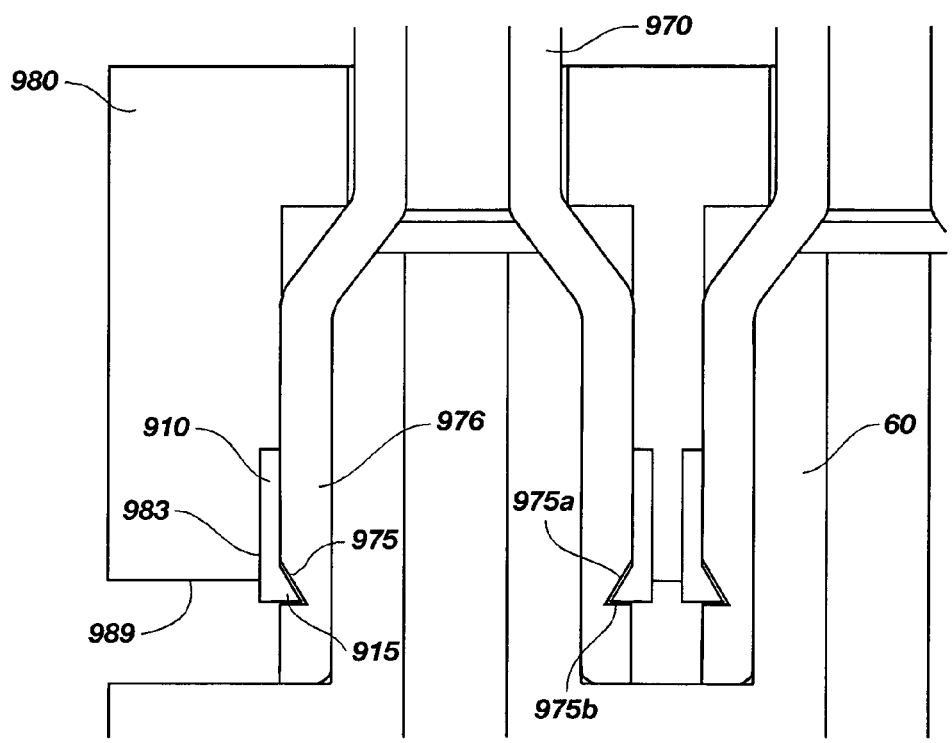
FIG. 11B shows an enlarged portion of the manifold shown in FIG. 11A.

In a tenth embodiment of the present invention, depicted in FIGS. 11A and 11B, an internal annular recess 983 within a cap 980 is provided for housing a gripper ring 910. The gripper ring 910 includes a lip 915 which mates with a radial groove 975 within the flared tube end portion 976. The radial groove 975 may include a tapered sidewall portion 975a being inclined radially inwardly toward a floor 975b of the groove, the floor 975b of the groove being the portion of the groove most proximate the manifold block 50. The groove floor 975b may be substantially parallel with a bottom surface 989 of the cap 980. If the flared tubing 970 is moved by any external pulling force applied thereto in the longitudinal direction, the flared tubing 970 will be latched against the cap 980 through the gripper ring 910 disposed within the internal annular recess 983. This may prevent the flared tubing 970 from being removed from the cap 980, and further secure the connection between the flare nose 60 and the flared tube end portion 976.

Figure 12A:
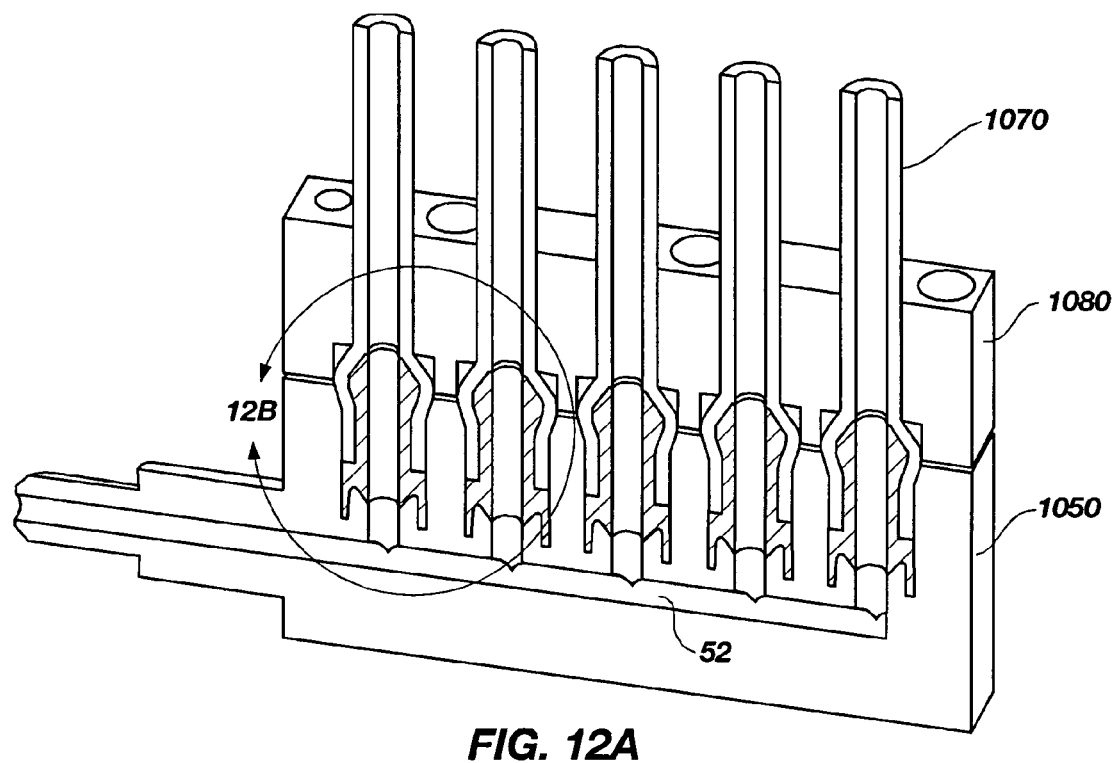
FIG. 12A shows a side cross-sectional view of an eleventh embodiment of a manifold according to the present invention.
Figure 12B:
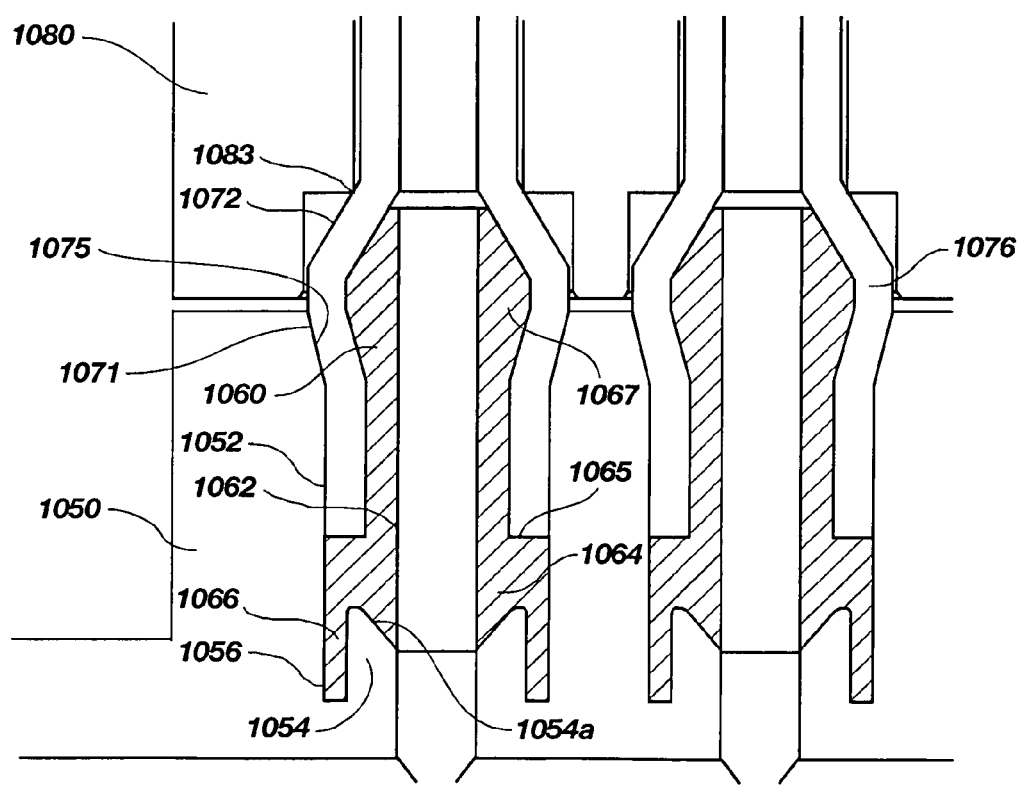
FIG. 12B shows an enlarged portion of the manifold shown in FIG. 12A.

In an eleventh embodiment of the present invention, depicted in FIGS. 12A and 12B, the manifold block 1050 includes a plurality of receiving ports 1052 therein. Receiving ports 1052 are described in U.S. Pat. No. 6,045,164 to Nishio, incorporated by reference herein. Short cylindrical portions 1054 protrude to the inside of the receiving ports 1052, creating an annular groove portion 1056 which is axially longer, disposed between each cylindrical portion 1054 and receiving port 1052. A tapered receiving surface 1054a of the cylindrical portions 1054 inclines to be widened toward a tip thereof, proximate the annular groove portion 1056. A flare nose 1060 includes a bore 1062 formed therethrough, in fluid communication with a fluid flow path 52 through the manifold block 1050. The flare nose 1060 further includes an axially-long annular portion 1066 which is inserted in the annular groove portion 1056 of the manifold block 1050. The flare nose 1060 may be connected to a flared tube 1070 by being forcibly inserted into a flared tube end portion 1076. A protruding portion 1064 of the flare nose 1060 may project from the end of the flared tube end portion 1076 when connected, with the end of flared tube 1070 abutting annular shoulder 1065 at the top of protruding portion 1064. The flare nose 1060 may include a radially outwardly enlarged portion 1067 with a mesa-shaped cross-section. When the flare nose 1060 is forcedly inserted into the flared tube end portion 1076, the enlarged portion 1067 forces the flared tube end portion 1076 to expand, creating a bulging section with a tapered outside abutting surface 1071, where the diameter is decreased as the flared tube extends downwardly within the manifold block 1050 and a tapered outside receiving surface 1072, where the diameter is decreased as the flared tube 1070 extends out and away from the manifold block 1050. When the cap 1080 is secured to manifold block 1050 using attachment elements, as described hereinabove, an upper portion 1083 of the cap presses against the tapered outside receiving surface 1072 of the flared tube 1070, applying a pressing force on the flare nose 1060 and forcibly inserting the axially long annular portion 1066 thereof in the annular groove portion 1056. The tapered receiving surface 1054a of the manifold block opposes a surface of the flare nose protruding portion 1064, and the flared tube tapered outside abutting surface 1071 opposes another, similarly tapered surface 1075 of the manifold block, generating an axial sealing surface pressure.

Figure 13A:
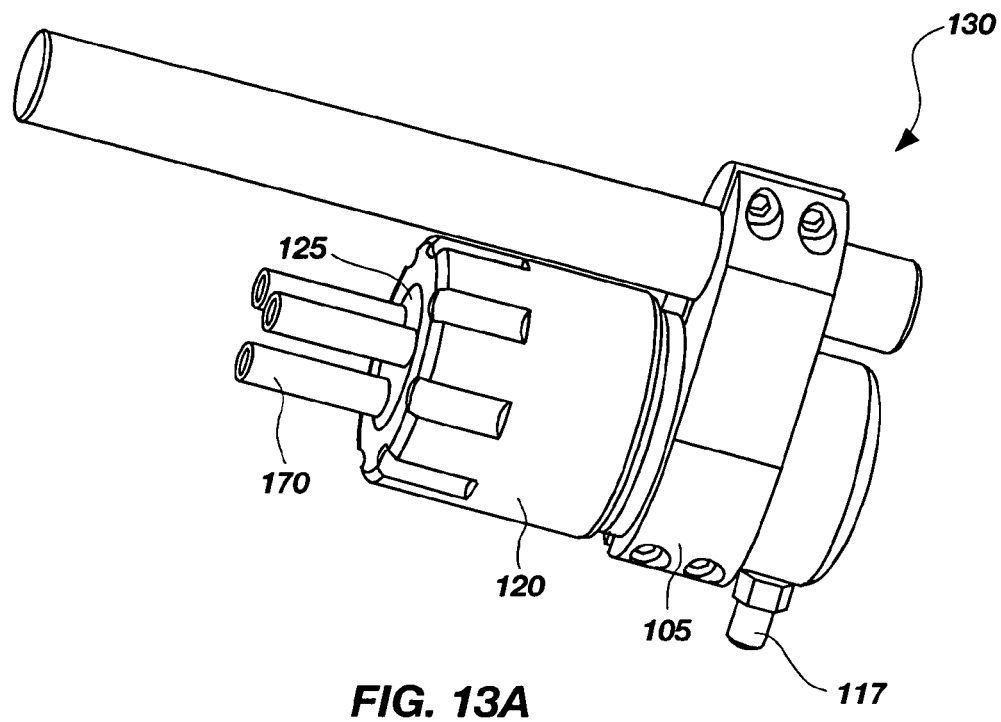
FIG. 13A shows a perspective view of a mini-mixer according to the present invention.
Figure 13B:
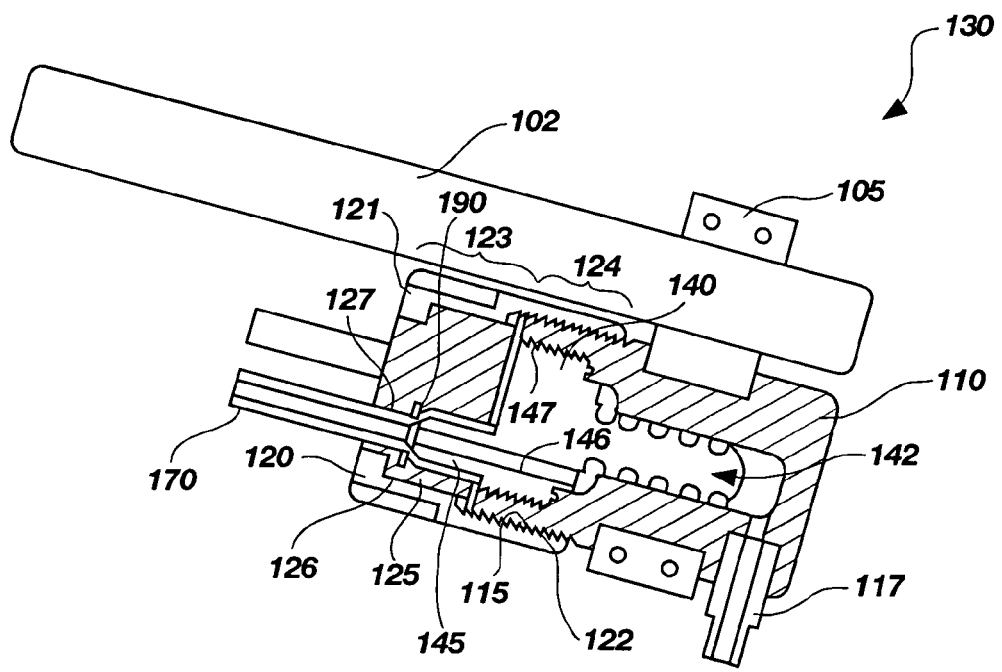
FIG. 13B shows a side cross-sectional view of the mini-mixer shown in FIG. 13A.
Figure 13C:
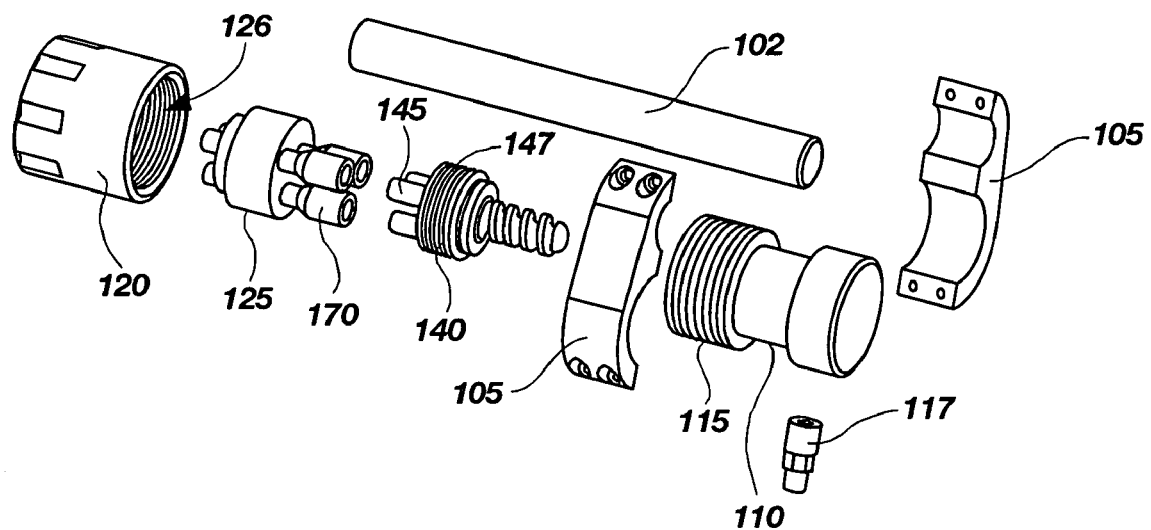
FIG. 13C shows an exploded view of the components of the mini-mixer shown in FIG. 13A.

FIGS. 13A and 13B depict a mini-mixer 130 according to the present invention. The mini-mixer 130 includes three flared tubes 170 and a cylindrical cap 120. The cylindrical cap 120 may have a longitudinal channel 126 therethrough, and a cap insert 125 may be positioned within a first axial section 123 of the longitudinal channel 126. The cap insert 125 may include three bores 127 therethrough, sized to receive the flared tubes 170. A cap insert configured to receive any number of flared tubes 170 is within the scope of the present invention. An annular rim 121 of the cylindrical cap 120 may secure the cap insert 125 therein. A second axial section 124 of the longitudinal channel 126 may be threaded with threads 122, depicted on an interior wall of the cylindrical cap 120, to engage with threads 115 (FIG. 13C) of a body 110 of the mini-mixer 130. Alternatively, the exterior wall of the cylindrical cap 120 may be threaded, and a portion of the cylindrical cap 120 may be received within the body 110 of the mini-mixer 130. In yet another alternative, the cylindrical cap 120 may include attachment apertures therethrough, and the cylindrical cap 120 may be secured to the body 110 of the mini-mixer 130 using attachment elements, as described hereinabove with respect to the first embodiment of the manifold of the present invention.

The body 110 of the mini-mixer 130 may include a body insert 140 having threads 147 for threadable attachment to the body 110. Three flare noses 145 protrude from the body insert 140, to be received by the flared tubes 170, as described hereinabove with respect to the first embodiment of the manifold of the present invention. An annular ring 190, shown in FIG. 13B may be provided to encircle the flared tube 170 at the point where the distal end of the flare nose 145 is received therein. An inside edge of the annular ring 190 may be sharp, to help grip the flared tube 170, securing the flare nose 145 therein.

An axial bore 146 within the flare nose 145 may be in fluid communication with a mixing chamber 142 of the body insert 140. The mixing chamber 142 may be in fluid communication with an outlet pipe 117. In use, fluids (not shown) may pass through the flared tubes 170, into the flare noses 145, and be mixed within the mixing chamber 142. The mixed fluids may exit the mini-mixer 130 through the outlet pipe 117. The body 110 of the mini-mixer-130 may be joined with an external structure 102, for example using a clamping structure 105.

Although specific embodiments have been shown by way of example in the drawings and have been described in detail herein, the invention may be susceptible to various modifications, combinations, and alternative forms. For example, a manifold having any number of tube connections and a cap of any shape is within the scope of the present invention. Therefore, it should be understood that the invention is not intended to be limited to the particular forms disclosed. Rather, the invention includes all modifications, equivalents, combinations, and alternatives falling within the spirit and scope of the invention as defined by the following appended claims.

What is claimed is:

1. A coupling assembly, comprising:
    a manifold for interconnecting at least two tubes, the manifold comprising an inner surface defining a portion of a fluid passageway;
    at least one elongated, generally cylindrical male protruding portion extending from the manifold, the at least one male protruding portion having an axis and a bore extending axially therethrough, a surface of the at least one male protruding portion within the bore defining another portion of the fluid passageway;
    at least one flared tube comprising a central passage and an end portion receiving the at least one male protruding portion;
    a cap having at least one bore therethrough receiving a portion of the at least one flared tube, the at least one bore having a first at least substantially cylindrical portion having a first diameter and a second at least substantially cylindrical portion having a second, relatively larger diameter, the cap having at least one attachment aperture therethrough; and
    at least one attachment element separate from the at least one bore of the cap, and the at least one attachment element passing through the at least one attachment aperture and securing the cap to the manifold.

2. The coupling assembly of claim 1, wherein the at least one attachment aperture is substantially parallel to the bore through the cap.

3. The coupling assembly of claim 1, wherein the at least one attachment element comprises a bolt.

4. The coupling assembly of claim 3, wherein the manifold includes a threaded attachment aperture for receiving and engaging a portion of the bolt.

5. The coupling assembly of claim 1, wherein the at least one male protruding portion is removably attached to the manifold.

6. The coupling assembly of claim 5, wherein the at least one male protruding portion includes a ring-shaped rim extending therefrom, substantially mating with a groove in the manifold.

7. The coupling assembly of claim 1, wherein the cap includes at least one slit extending through a surface thereof.

8. The coupling assembly of claim 1, wherein the at least one male protruding portion comprises a plurality of male protruding portions, the at least one flared tube comprises a like plurality of flared tubes, and further comprising a like plurality of caps, each cap having a bore therethrough configured for receiving one of the plurality of flared tubes, each cap having at least one attachment aperture therethrough.

9. The coupling assembly of claim 1, wherein the at least one flared tube includes a body having a first outside diameter, the end portion thereof has a second, greater outside diameter and a shoulder portion thereof is positioned between the body and the end portion.

10. The coupling assembly of claim 9, wherein the bore through the cap is configured for receiving at least a part of the body of the at least one flared tube and at least a part of the end portion of the at least one flared tube.

11. The coupling assembly of claim 9, wherein the bore through the cap has an inside diameter substantially the same as the first outside diameter of the tube body of the at least one flared tube.

12. The coupling assembly of claim 9, wherein the cap includes a surface abutting an outside surface of the shoulder portion of the at least one flared tube, the surface characterized by a plurality of ridges.

13. The coupling assembly of claim 9, further comprising a gripper ring encircling the at least one flared tube.

14. The coupling assembly of claim 13, wherein the gripper ring encircles a portion of the body and the shoulder portion of the at least one flared tube.

15. The coupling assembly of claim 14, wherein the gripper ring includes a first surface abutting an outside surface of the shoulder portion of the at least one flared tube and a second, opposing surface, substantially parallel thereto, in contact with the cap.

16. The coupling assembly of claim 14, wherein the gripper ring includes a first surface abutting an outside surface of the shoulder portion of the at least one flared tube and a second surface extending radially from the body of the at least one flared tube, in contact with the cap.

17. The coupling assembly of claim 13, wherein the gripper ring encircles the end portion of the at least one flared tube.

18. The coupling assembly of claim 17, wherein the end portion of the at least one flared tube includes a plurality of spaced apertures therethrough and wherein the gripper ring includes a plurality of inwardly facing bosses that fit into and cooperate with the plurality of spaced apertures.

19. The coupling assembly of claim 18, wherein the gripper ring includes a tapered upper edge abutting a surface of the cap.

20. The coupling assembly of claim 18, wherein the gripper ring includes a body portion having a rectangular cross-section and wherein the at least one bore through the cap includes a counterbore of constant diameter for receiving the gripper ring body portion.

21. The coupling assembly of claim 15, wherein the gripper ring including an inwardly projecting lip extending into an annular groove within the end portion.

22. The coupling assembly of claim 1, wherein the at least one male protruding portion includes an enlarged portion for expanding part of the end portion disposed therein.

23. A coupling assembly, comprising:
a plurality of male protruding portions extending from a component, each male protruding portion of the plurality having an axis and a bore extending axially therethrough, an inner surface of each male protruding portion of the plurality defining a portion of a respective fluid passageway in fluid communication with another portion of the respective fluid passageway defined by an inner surface of the component;
a plurality of flared tubes, each flared tube comprising a central passage and an end portion receiving a male protruding portion of the plurality of male protruding portions;
a cap having a plurality of bores therethrough, each bore having a first at least substantially cylindrical portion having a first diameter and a second at least substantially cylindrical portion having a second, relatively larger diameter and receiving a portion of a flared tube of the plurality; and
at least one attachment element securing the cap to the component.

24. The coupling assembly of claim 23, wherein the at least one attachment element comprises threads on a bore extending at least partially through the cap.

25. The coupling assembly of claim 23, wherein the at least one attachment element comprises pins configured to engage with attachment apertures extending through the cap.

26. The coupling assembly of claim 25, wherein the attachment apertures are substantially parallel to the plurality of bores through the cap.

27. The coupling assembly of claim 23, wherein the at least one attachment element comprises a bolt.

28. The coupling assembly of claim 27, wherein the component includes a threaded attachment aperture for receiving and engaging a portion of the bolt.

29. The coupling assembly of claim 23, wherein each male protruding portion of the plurality is removably attached to the component.

30. The coupling assembly of claim 29, wherein the plurality of male protruding portions each include a ring-shaped rim extending therefrom substantially mating with a groove in the component.

31. The coupling assembly of claim 23, wherein the cap includes at least one slit extending from a surface thereof.

32. The coupling assembly of claim 23, wherein each flared tube of the plurality of flared tubes includes a body having a first outside diameter, the end portion thereof has a second, greater outside diameter and a shoulder portion thereof is positioned between the body and the end portion.

33. The coupling assembly of claim 32, wherein each bore of the plurality of bores through the cap has an inside diameter substantially the same as the first outside diameter of each flared tube body.

34. The coupling assembly of claim 32, wherein the cap includes a surface abutting an outside surface of the shoulder portion of at least one flared tube of the plurality, the surface characterized by a plurality of ridges.

35. The coupling assembly of claim 23, wherein each bore of the plurality of bores through the cap is configured for receiving at least a part of the body of each flared tube of the plurality and at least a part of the end portion of each flared tube of the plurality.

36. The coupling assembly of claim 32, further comprising a gripper ring encircling at least one flared tube of the plurality.

37. The coupling assembly of claim 36, wherein the gripper ring encircles the body and the shoulder portion of the at least one flared tube.

38. The coupling assembly of claim 37, wherein the gripper ring includes a first surface abutting an outside surface of the shoulder portion of the at least one flared tube and a second, opposing surface, substantially parallel thereto, in contact with the cap.

39. The coupling assembly of claim 37, wherein the gripper ring includes a first surface abutting an outside surface of the shoulder portion of the at least one flared tube and a second surface extending radially from the body of the at least one flared tube, in contact with the cap.

40. The coupling assembly of claim 36, wherein the gripper ring encircles the end portion of the at least one flared tube.

41. The coupling assembly of claim 40, wherein the end portion of the at least one flared tube includes a plurality of spaced apertures therethrough and wherein the gripper ring includes a plurality of inwardly facing bosses that fit into and cooperate with the plurality of spaced apertures.

42. The coupling assembly of claim 41, wherein the gripper ring includes a tapered upper edge abutting a surface of the cap.

43. The coupling assembly of claim 41, wherein the gripper ring includes a body portion having a rectangular cross-section and wherein the plurality of bores through the cap each includes a counterbore of constant diameter for receiving the gripper ring body portion.

44. The coupling assembly of claim 40, wherein a lip of the gripper ring extends into an annular groove within the flared tube end portion.

45. The coupling assembly of claim 23, wherein the plurality of male protruding portions each include an enlarged portion expanding part of the flared tube end portion disposed therein.

46. A structure for retaining a first tube segment within a second tube segment, comprising:
  a base, the first tube segment extending from a portion of the base; and
  a monolithic cap having a bore extending therethrough, the bore having a first portion encircling a portion of the second tube segment, the bore having a second portion encircling a portion of the second tube segment and at least a portion of the first tube segment, the cap attached to the base so as to form a space therebetween;
  wherein the cap includes at least one attachment aperture extending therethrough.

47. The structure of claim 46, wherein the cap includes at least one attachment aperture extending therethrough.

48. The structure of claim 47, further including at least one attachment element received within the at least one attachment aperture and extending between the cap and the base and passing through the space therebetween.

49. A method of coupling a first tube segment with a second tube segment, comprising:
  providing a base structure comprising a manifold for interconnecting at least two tubes, the base structure having a first tube segment protruding therefrom;
  positioning an end portion of a second tube segment over at least a portion of the first tube segment and forming a fluid passageway defined by an inner surface of the second tube segment, an inner surface of the first tube segment, and an inner surface of the manifold;
  encircling a portion of the second tube segment with a cap with a bore having a first at least substantially cylindrical portion having a first diameter and a second at least substantially cylindrical portion having a second, relatively larger diameter; and
  attaching the cap to the base structure with at least one attachment element received in an attachment aperture of the cap and secured to the base structure.

50. The method of claim 49, further comprising forming at least one slit through a surface of the cap.

51. The method of claim 49, wherein the at least one attachment element comprises two attachment elements, the two attachment elements parallel to the second tube segment.

52. The method of claim 49, further comprising encompassing another portion of the second tube segment with a gripper ring.

53. The method of claim 52, further comprising engaging a plurality of protruding bosses of the gripper ring with a plurality of spaced apertures of the second tube segment.

54. The method of claim 52, further comprising mating a lip of the gripper ring with an annular groove of the second tube segment.

55. A method of coupling a plurality of first tube segments with a like plurality of second tube segments, comprising:
  providing a base structure having the plurality of first tube segments protruding therefrom;
  positioning each second tube segment of the plurality of second tube segments with an end portion thereof receiving a portion of a corresponding first tube segment of the plurality of first tube segments.
  individually encircling a portion of each second tube segment with a single monolithic cap with a bore having a first at least substantially cylindrical portion having a first diameter and a second at least substantially cylindrical portion having a second, relatively larger diameter; and
  attaching the single cap to the base structure.

56. The method of claim 55, wherein attaching the single cap to the base structure comprises receiving at least one attachment element within an attachment aperture of the cap and securing the attachment element to the base structure.

57. The method of claim 55, wherein attaching the single cap to the base structure comprises threadedly attaching the single cap to the base structure.

\* \* \* \* \*

UNITED STATES PATENT AND TRADEMARK OFFICE
CERTIFICATE OF CORRECTION

PATENT NO. : 7,591,485 B2  Page 1 of 1
APPLICATION NO. : 11/179724
DATED : September 22, 2009
INVENTOR(S) : Simmons et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 577 days.

Signed and Sealed this

Fourteenth Day of December, 2010

David J. Kappos
*Director of the United States Patent and Trademark Office*

UNITED STATES PATENT AND TRADEMARK OFFICE
CERTIFICATE OF CORRECTION

| | | |
|---|---|---|
| PATENT NO. | : 7,591,485 B2 | Page 1 of 1 |
| APPLICATION NO. | : 11/179724 | |
| DATED | : September 22, 2009 | |
| INVENTOR(S) | : Tom M. Simmons, John M. Simmons and David M. Simmons | |

It is certified that error appears in the above-identified patent and that said Letters Patent is hereby corrected as shown below:

In the Specification:

COLUMN 9, LINE 63, change "mini-mixer-130" to --mini-mixer 130--

Signed and Sealed this
Twenty-first Day of May, 2013

Teresa Stanek Rea
*Acting Director of the United States Patent and Trademark Office*